(12) United States Patent
Gisquet et al.

(10) Patent No.: US 10,694,207 B2
(45) Date of Patent: Jun. 23, 2020

(54) METHODS, DEVICES, AND COMPUTER PROGRAMS FOR COMBINING THE USE OF INTRA-LAYER PREDICTION AND INTER-LAYER PREDICTION WITH SCALABILITY AND SCREEN CONTENT FEATURES

(71) Applicant: CANON KABUSHIKI KAISHA, Tokyo (JP)

(72) Inventors: Christophe Gisquet, Acigne (FR); Guillaume Laroche, Saint Aubin D'Aubigne (FR); Patrice Onno, Rennes (FR)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/425,838

(22) Filed: Feb. 6, 2017

(65) Prior Publication Data

US 2017/0230685 A1 Aug. 10, 2017

(30) Foreign Application Priority Data

Feb. 8, 2016 (GB) .................................. 1602257.6

(51) Int. Cl.
*H04N 19/11* (2014.01)
*H04N 19/573* (2014.01)
(Continued)

(52) U.S. Cl.
CPC .......... *H04N 19/573* (2014.11); *H04N 19/11* (2014.11); *H04N 19/593* (2014.11); *H04N 19/70* (2014.11)

(58) Field of Classification Search
None
See application file for complete search history.

(56) References Cited

U.S. PATENT DOCUMENTS

2008/0187045 A1  8/2008 Marquant et al.
2013/0114741 A1* 5/2013 Sullivan ................. H04N 19/70
                                                                375/240.25

(Continued)

FOREIGN PATENT DOCUMENTS

EP         1808023 B1      4/2009

OTHER PUBLICATIONS

Joshi, et al., "High Efficiency Video Coding (HEVC) Screen Content Coding: Draft 5", Document: JCTVC-VI005, Joint Collaborative Team on Video Coding (JCT-VC) of ITU-T SG 16 WP 3 and ISO/IEC JTC 1/SC 29/WG 11, 22nd Meeting: Geneva, CH, Oct. 15-21, 2015, Sections 7.3.6.3, H.8.3.4, F.83.4,.

*Primary Examiner* — Shadan E Haghani
(74) *Attorney, Agent, or Firm* — Canon U.S.A., Inc. IP Division

(57) ABSTRACT

The present invention relates to encoding an image of a video stream according to at least one coding mode selected among a plurality of coding modes used to encode images of the video stream, where blocks of the image to be encoded are predicted as a function of at least one reference image from a set of at least one reference image, the at least one reference image comprising at least a reconstructed spatial portion of the image to be encoded and at least a low resolution portion of the image to be encoded, the choice between a reconstructed spatial sub-portion or a low resolution sub-portion to be used for encoding a block of the image to be encoded being determined as a function of a control parameter.

13 Claims, 9 Drawing Sheets

(51) Int. Cl.
*H04N 19/593* (2014.01)
*H04N 19/70* (2014.01)

(56) References Cited

U.S. PATENT DOCUMENTS

| | | | | |
|---|---|---|---|---|
| 2014/0072031 A1* | 3/2014 | Xiu | ...................... | H04N 19/105 |
| | | | | 375/240.02 |
| 2014/0301459 A1* | 10/2014 | Boyce | .................. | H04N 19/105 |
| | | | | 375/240.12 |
| 2014/0341273 A1* | 11/2014 | Ye | .......................... | H04N 19/36 |
| | | | | 375/240.02 |
| 2015/0304665 A1* | 10/2015 | Hannuksela | ........... | H04N 19/70 |
| | | | | 375/240.02 |
| 2016/0330474 A1* | 11/2016 | Liu | ...................... | H04N 19/503 |
| 2016/0360210 A1* | 12/2016 | Xiu | ...................... | H04N 19/176 |
| 2016/0381373 A1* | 12/2016 | Seregin | ................ | H04N 19/503 |
| | | | | 375/240.12 |
| 2017/0195675 A1* | 7/2017 | Seok | .................... | H04N 19/147 |

\* cited by examiner

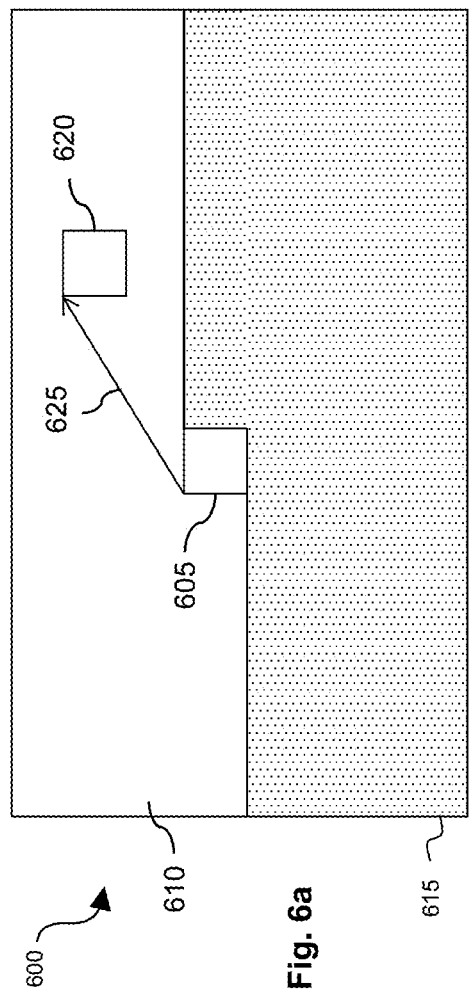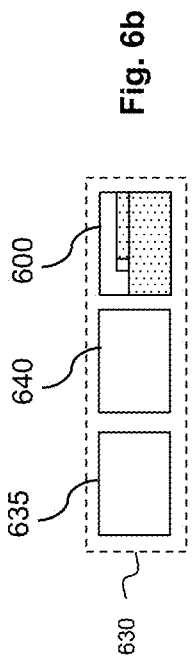
Fig. 6a
Fig. 6b

METHODS, DEVICES, AND COMPUTER PROGRAMS FOR COMBINING THE USE OF INTRA-LAYER PREDICTION AND INTER-LAYER PREDICTION WITH SCALABILITY AND SCREEN CONTENT FEATURES

CROSS REFERENCE TO RELATED APPLICATION

This application claims the benefit under 35 U.S.C. § 119(a)-(d) of United Kingdom Patent Application No. 1602257.6, filed on Feb. 8, 2016 and entitled "Methods, devices, and computer programs for combining the use of intra-layer prediction and inter-layer prediction with scalability and screen content features". The above cited patent application is incorporated herein by reference in its entirety.

FIELD OF THE INVENTION

The present invention relates in general to video compression and in particular to methods, devices, and computer programs for combining the use of intra-layer prediction and inter-layer prediction with scalability and screen content features.

BACKGROUND OF THE INVENTION

High Efficiency Video Coding (HEVC, ISO/IEC 23008-2 MPEG-H Part 2/ITU-T H.265) is the current joint video coding standardization project of the ITU-T Video Coding Experts Group (ITU-T Q.6/SG 16) and ISO/IEC Moving Picture Experts Group (ISO/IEC JTC 1/SC 29/WG 11). The core part of HEVC, as well as the Range, Scalable (SHVC) and multiview (MV-HEVC) extensions, are finalized and efforts are directed towards the standardization of the screen content coding (SCC) extension. Each part or extension also defines various profiles, i.e. implicit parameters or limits on them, such as Main, Main10, Scalable Main, Scalable Main 10, 4:4:4 8 bits, and the like.

Many research activities were conducted in the past on the definition of scalable extensions for video compression standards. These researches were mainly motivated by the wish to offer video streams having adaptation capabilities. Indeed, it has been noted that the same video can be used for different purposes, by different clients having different display, decoding, or network capabilities. In order to address these adaptation capabilities, several types of scalability were defined, the most popular being the temporal scalability, the spatial scalability, and the scalability in quality also known as the SNR (Signal to Noise Ratio) scalability. SHVC is an example of such extension defined above the HEVC standard.

A simple approach to encode several versions of same video data consists in encoding independently each version. However, it is well known that better compression performances are obtained by exploiting as much as possible the correlations existing between the different versions. To do so, scalable or multi-view video encoders start by encoding one version of the video that becomes a base or a reference version. This version is self-contained, meaning that it doesn't refer to any other version. The resulting stream representing the base version is in general fully compliant with the core standard, but not only, for instance compliant with HEVC in the case of SHVC and MV-HEVC. The base version may however be compliant with another extension, such as Range Extensions, when it is 4:4:4. Other versions are then encoded predictively with respect to this base version and exploit the correlations. The prediction could be either direct, with a direct dependence on the base version or indirect by referring to an intermediate version encoded between the base version and the current version. The intermediate versions are then a reference version. One can note that the terminology "reference version" can also apply to a base version.

In scalable encoding, the base version is generally called the "base layer" or "reference layer" and provides the lowest quality, and the lowest spatial and temporal resolution. Other versions are called "enhancement layers". Enhancement layers could enhance the quality, the spatial resolution or the temporal resolution of a base layer.

In the multi-view video coding, the reference version is generally called the main view and the other versions are called the dependent views.

Further improvements of the compression efficiency can be obtained by taking benefit of the encoding choices made in a base or a reference version. Indeed, since images are correlated, similar encoding choices should be taken. As a consequence some syntax elements can be either inferred or predicted from same syntax elements in a reference version. In particular, both SHVC and MV-HEVC use motion information of the base or reference versions to predict motion information of the other versions.

FIG. 1 is a block diagram illustrating an encoder implementing the scalable extension of HEVC as defined in the 3rd working draft (JCTVC-N1008: High efficiency video coding (HEVC) scalable extension draft 3, output document of JCT-VC, 14th meeting, Vienna, AT, 25 Jul.-2 Aug. 2013). As can be seen in FIG. 1, the encoder comprises two stages: a first stage noted 100A for encoding a base layer and a second stage denoted 100B for encoding an enhancement layer. Further stages similar to the second stage could be added to the encoder depending on the number of scalable layers to be encoded.

The first stage 100A aims at encoding an HEVC compliant base layer. The input to this non-scalable stage comprises an original sequence of images, obtained by applying a down-sampling (step 110) to images (105) if the different layers have different spatial resolutions. In a first step, during the encoding, an image is divided into blocks of pixels (step 115A), called coding units (CU) in the HEVC standard. Each block is then processed during a motion estimation operation (step 120A), which comprises a step of searching, among the reference pictures stored in a dedicated image buffer (125A), also called frame or picture buffer, for reference blocks that would provide a good prediction of the block to encode.

This motion estimation step provides one or more reference image indexes representing one or more indexes in the image buffer of images containing the found reference blocks, as well as corresponding motion vectors indicating the position of the reference blocks in the reference images.

Next, during a motion compensation step (130A), the estimated motion vectors are applied to the found reference blocks for computing a temporal residual block which corresponds to the difference between a predictor block, obtained through motion compensation, and the original block to predict.

In parallel or sequentially after the temporal prediction steps, an Intra prediction step (step 135A) is carried out to determine a spatial prediction mode that would provide the best performance to predict the current block. Again, a spatial residual block is computed. In this case, it is computed as being the difference between a spatial predictor computed using pixels in the neighbourhood of the block to encode and the original block to predict.

Afterwards, a coding mode selection mechanism (step 140A) chooses the coding mode to be used, among the spatial and temporal prediction modes, which provides the best rate distortion trade-off in the coding of the current block. Depending on the selected prediction mode, steps of applying a transform of the DCT type (Discrete Cosine Transform) and a quantization (step 145A) to the residual prediction block are carried out. Next, the quantized coefficients (and associated motion data) of the prediction information as well as the mode information are encoded using entropy coding (step 150A). The compressed data 155 associated with the coded current block are then sent to an output buffer.

It is to be noted that HEVC has adopted an improved process for encoding motion information. Indeed, while in the previous video compression standards, motion information was predicted using a predictor corresponding to a median value computed on the spatially neighbouring blocks of the block to encode, in HEVC a competition is performed on predictors corresponding to neighbouring blocks to determine the predictor offering the best rate distortion performances. In addition, motion predictor candidates comprise the motion information related to spatial neighbouring block and to temporally collocated blocks belonging to another encoded image. As a consequence, motion information of previously encoded images need to be stored to allow a prediction of motion information. In the current version of the standard, these information are optionally stored in a compressed form by the encoder and the decoder to limit the memory usage of the encoding and decoding process.

After the current block has been encoded (step 145A), it is reconstructed. To that end, an inverse quantization (also called scaling) and inverse transform step is carried out (step 160A). This step is followed (if needed) by a sum between the inverse transformed residual and the prediction block of the current block in order to form the reconstructed block. The reconstructed image composed of the reconstructed blocks is post filtered (step 165A), e.g. using deblocking and sample adaptive offsets filters of HEVC. The post-filtered reconstructed image is finally stored in the image buffer 125A, also referred to as the DPB (Decoded Picture Buffer), so that it is available for use as a reference picture to predict any subsequent images to be encoded.

The motion information in the DPB associated with this image is stored in a summarized form in order to limit the memory required to store these information. The first step of the summarization process consists in dividing the image in block of size 16×16. Then each 16×16 block is associated with a motion information representative of the original motion of blocks of the encoded image included in this 16×16 blocks.

Finally, an entropy coding step is applied to the coding mode and, in case of an inter CU, to the motion data, as well as the quantized DCT coefficients previously calculated. This entropy coder encodes each of these data into their binary form and encapsulates the so-encoded block into a container called NAL unit (Network Abstract Layer). A NAL unit contains all encoded coding units from a given slice. A coded HEVC bit-stream consists in a series of NAL units.

As can be seen in FIG. 1, the second stage 100B of the scalable encoder is similar to the first stage. Nevertheless, as will be described in greater detail below, high-level changes have been adopted, in particular in the image buffer management 125B. As can be seen, this buffer receives reconstructed images from the base layer, in addition to mode and motion information. An optional intermediate up-sampling step can be added when the two scalable layers have different spatial resolutions (step 170). This information, obtained from the reference layer, is then used by other modules of stage 100B in a way similar to the ones of stage 100A. Steps 115B, 120B, 130B, 135B, 140B, 145B, 150B, 160B, and 165B correspond to steps 115A, 120A, 130A, 135A, 140A, 145A, 150A, 160A, and 165A, described by reference to stage 100A, respectively.

FIG. 2 is a block diagram illustrating an SHVC decoder compliant with a bit-stream such as the one generated by the SHVC encoder illustrated in FIG. 1. The scalable stream to be decoded, denoted 200, is made of a base layer and an enhancement layer that are multiplexed (of course, the scalable stream may comprise more several enhancement layers). The two layers are de-multiplexed (step 205) and provided to their respective decoding stage denoted 210A and 210B.

Stage 210A is in charge of decoding the base layer. In this stage, the base layer bit-stream is first decoded to extract coding units (or blocks) of the base layer. More precisely, an entropy decoding step (step 215A) provides the coding mode, the motion data (reference pictures indexes, motion vectors of INTER coded macroblocks, and direction of prediction for intra prediction), and residual data associated with the blocks. Next, the quantized DCT coefficients constituting the residual data are processed during an inverse quantization operation and an inverse transform operation (step 220A).

Depending on the mode associated with the block being processed (step 225A), a motion compensation step (step 230A) or an Intra prediction step (step 235A) is performed, and the resulting predictor is added to the reconstructed residual obtained in step 220A). Next, a post-filtering step is applied to remove encoding artefacts (step 240A). It corresponds to the filtering step 265A in FIG. 1, performed at the encoder's end.

The so-reconstructed blocks are then gathered in the reconstructed image which is stored in the decoded picture buffer denoted 245A in addition to the motion information associated with the INTER coded blocks.

Stage 210B takes charge of the decoding of the enhancement layer. Similarly to the decoding of the reference layer, a first step of decoding the enhancement layer is directed to entropy decoding of the enhancement layer (step 215B), which provides the coding modes, the motion or intra prediction information, as well as the transformed and quantized residual information of blocks of the enhancement layer.

Next, quantized transformed coefficients are processed in an inverse quantization operation and in an inverse transform operation (step 220B). An INTER or INTRA predictor is then obtained (step 230B or step 235B) depending on the mode as obtained after entropy decoding (step 225B).

In the case where the INTER mode is used to obtain INTER predicted blocks, the motion compensation step to be performed (step 230B) requires the decoding of motion information. To that end, the index of the predictor selected by the encoder is obtained from the bit-stream along with a motion information residual. The motion vector predictor and the motion residual are then combined to obtain the decoded motion information, allowing determination of the INTER predictor to be used. Next, the reconstructed temporal residual is added to the identified INTER predictor to obtain the reconstructed block.

Reconstructed blocks are then gathered in a reconstructed image on which a post-filtering step is applied (step 240B) before storage in the image buffer denoted 245B of the enhancement layer. To be compliant with the encoder, the policy applied by the encoder for the management of the image buffer of the enhancement layer is applied by the decoder. Accordingly, the enhancement layer image buffer receives motion and mode information from the base layer along with reconstructed image data, that are interpolated if necessary (step 250).

As mentioned above, it has been decided during the development of the scalable extension of HEVC to avoid as much as possible the definition of new coding tools specific to the scalable format. As a consequence, the decoding process and the syntax at the coding unit (block) level in an enhancement layer have been preserved and only high-level changes to the HEVC standard introduced.

Inter layer prediction of an image of an enhancement layer is obtained, in particular, through the insertion of information representing the corresponding image of the reference layer in the image buffer (references 125B in FIGS. 1 and 245B in FIG. 2) of the enhancement layer. The inserted information comprises decoded pixel information and motion information. This information can be interpolated when the scalable layers have different spatial resolutions. The references to these images are then inserted at the end of specific reference image lists, depending on the type of the current slice of the enhancement layer.

It is to be recalled that according to HEVC, images are coded as independently decodable slices (i.e. independently decodable strings of CTU (Coding Tree Units)). There exist three types of slices:

intra slices (I) for which only intra prediction is allowed;
predictive slices (P) for which intra prediction is allowed as well as inter prediction from one reference image per block using one motion vector and one reference index; and
bi-predictive slices (B) for which intra prediction is allowed as well as inter prediction from one or two reference images per block using one or two motion vectors and one or two reference indexes.

A list of reference images is used for decoding predictive and bi-predictive slices. According to HEVC, two reference image lists denoted L0 and L1 are used. L0 list is used for decoding P and B slices while L1 list is used only for decoding B slices. These lists are set up for each slice to be decoded.

In a P slice, the image obtained from a base layer, also called ILR (Inter Layer Reference), is inserted at the end of the L0 list. In a B slice, ILR images are inserted at the end of both the L0 and L1 lists.

By inserting ILR images in the lists, the image of the reference layer corresponding temporally to the image to encode, that may be interpolated (or up-sampled) if needed, becomes a potential reference image that can be used for temporal prediction. Accordingly, blocks of an inter layer reference (ILR) image can be used as predictor blocks in INTER mode.

In HEVC (and all its extensions, including SHVC and SCC extensions), the inter mode ("MODE_INTER") and intra mode ("MODE_INTRA") are prediction modes that are signalled in the bit-stream by a syntax element denoted "pred_mode_flag". This syntax element takes respectively the value 0 and 1 for the inter mode and the intra mode respectively. This syntax element may be absent (e.g. for slices of the intra type where there is no block coded using the inter mode), in which case it is assumed to be 1. In addition, two sets of motion information (also called motion fields) are defined. They correspond to the reference image lists L0 and L1. Indeed, as mentioned above, a block predicted using "MODE_INTER" may use one or two motion vector predictors depending on the type of inter prediction.

Each motion vector predictor is obtained from an image belonging to a reference list. When two motion vector predictors are used to predict the same block (B slices, i.e. bi-predictive coding), the two motion vector predictors belong to two different lists. The syntax element "inter_pred_idc" allows identifying the lists involved in the prediction of a block. The values 0, 1 and 2 respectively mean that the block uses L0 alone, L1 alone, and both. When absent, it can be inferred to be L0 alone, which is the case for slices of P type.

Generally, L0 list of reference images contains images preceding the current image while L1 list contains images following the current image. However, in HEVC preceding and following images can appear in any list.

The motion information (motion field) contained in an INTER block for one list consists in the following information:

an availability flag denoted "predFlagLX" which indicates that no motion information is available when it is equal to 0;
an index denoted "ref_idxLX" for identifying an image in a list of reference images. The value −1 of this index indicates the absence of motion information; and,
a motion vector that has two components: an horizontal motion vector component denoted "mvLX[0]" and a vertical motion vector component denoted "mvLX[1]". It corresponds to a spatial displacement in terms of pixels between the current block and the temporal predictor block in the reference image.

wherein the suffix "LX" of each syntax element takes the value "L0" or "L1".

A block of the inter type is therefore associated with two motion fields.

As a consequence, the standard specification implies the following situations:

for a block of the intra type:
"pred_mode_flag" is set to 1 (MODE_INTRA);
for each of the L0 and L1 lists:
"predFlagLX" is set to 0;
"refIdxLX" is set to −1; and
"mvLX[0]" and "mvLX[1]" should not be used because of the values of "predFlagLX" and "refIdxLX".
for a block of the inter type using only the L0 list:
"pred_mode_flag" is set to 0 (MODE_INTER);
L0 list motion information:
"predFlagL0" is set to 1;
"refIdxL0" indicates a reference image in the L0 list in the DPB;
"mvL0[0]" and "mvL0[1]" are set to the corresponding motion vector values.
L1 list motion information:
"predFlagL1" is set to 0;
"refIdxL1" is set to −1; and
"mvL1[0]" and "mvL1[1]" should not be used because of the values of "predFlagL1" and "refIdxL1".
for a block of the inter type using only the L1 list: motion information is similar to motion information for a block of the inter type using only the L0 list except that L0 and L1 are swapped.

for a block of the inter type using both the L0 and L1 lists (i.e. slices of the B type):
"pred_mode_flag" is set to 0 (MODE_INTER);
for each of the L0 and L1 lists:
"predFlagLX" is set to 1;
"refIdxLX" indicates a reference image in the corresponding L0 or L1 list in the DPB;
"mvLX[0]" and "mvLX[1]" are set to the corresponding motion vector values.

As already stated, motion information is coded using a predictive coding in HEVC. One particularity of the prediction of motion information in HEVC is that a plurality of motion information predictors is derived from blocks neighbouring the block to encode and one best predictor is selected in this set, the selection being based on a rate-distortion criterion. Another particularity of the approach adopted by HEVC is that, these derived predictors can comprise motion information from spatially neighbouring blocks but also from temporally neighbouring blocks.

FIG. 3 represents schematically a spatially scalable video sequence compliant with SHVC. For the sake of illustration, it comprises only two layers, for example a reference layer and an enhancement layer, denoted RL and EL. The first layer RL is compliant with HEVC. EL layer uses the same prediction scheme as described in the SHVC draft specifications. As can be seen in FIG. 3, the image of the first layer at time t2, denoted (RL, t2), has been inserted in the image buffer of EL layer after being up-sampled so as to be of the same size as the image of the EL layer. Therefore, this ILR image can used to provide a temporal predictor to the block denoted BEL belonging to the image of the second layer at time t2, denoted (EL, t2). This predictor is identified by motion information comprising a motion vector. For the sake of illustration, the motion vector is equal to (0, 0) since the block to predict and the predictor are collocated.

It is to be noted that a similar concept is used in the MV-HEVC (for multi-views) and 3D-HEVC extensions: instead of an ILR image, with potential resampling, the corresponding images in other views may be added to the reference picture lists in a way similar to the one described by reference to FIG. 3.

SHVC provides a method for deriving motion information of an ILR image to be inserted in the motion part of the decoded picture buffer of an enhancement layer.

FIG. 4 illustrates steps of a method for deriving motion information from two images: one image of the enhancement layer and one image of the reference layer corresponding to an image to be encoded of the enhancement layer.

The process starts when an image of the enhancement layer is to be encoded.

During an initialization step (step 400), the image of the reference layer, denoted refRL, corresponding to the image to be encoded is identified to be stored in the image buffer as the ILR. If necessary, the image refRL is up-sampled (if the reference and enhancement layers have different spatial resolutions) before being stored as the ILR. In addition, during this initialization step, a first block of 16×16 pixels of the ILR image is identified.

Next, the position of the centre of the identified 16×16 block is determined (step 405). The determined centre is used to determine the collocated position in the identified image refRL of the reference layer (step 415). The determined collocated position is used in the following to identify respectively a block bEL of the ILR image and a block bRL of the reference layer image refRL that can provide motion information to the ILR image.

Information representative of the first motion information (motion field corresponding to the first list (L0 or L1)) associated with the identified block bRL is then obtained (step 420).

Then, a first test is performed (step 430) to verify the availability of the bRL block at the collocated position found in step 415. If no block is available at that position, the current 16×16 block of the ILR image is marked as having no motion information in list LX (step 435), for instance by setting the flag "predFlagLX" to 0 and the flag "refIdxLX" to −1. Next, the process proceeds to step 440 which is detailed hereafter.

On the contrary, if it is determined that the bRL block in the reference layer is available at the position collocated with centre (step 430), the mode of the bRL block is identified. If it is determined (step 445) that this mode is "MODE_INTRA", the ILR motion field is set to have no motion information (step 435) and the process proceeds to step 440.

If the bRL block of the reference layer is not encoded according to the intra mode but using the inter mode (step 445), the current motion field of the current 16×16 block of the ILR image takes the values of the first motion field of the bRL block of the reference image identified in step 415 (steps 450 and 455):
"predFlagLXILR"="predFlagLXRL";
"refIdxLXILR"="refIdxLXRL";
"mvLXILR[O]"="mvLXRL[0]";
"mvLXILR[1]"="mvLXRL[1]";
wherein X equal to 0 and 1 for list L0 and list L1, respectively, and where "mvLXILR[O]", "mvLXRL[0]", "mvLXILR[1]", and "mvLXRL[1]" represent vector components. It is to be noted that a scaling factor may be applied to the motion vector of the reference layer during step 455 if the reference and enhancement layers have different spatial resolutions.

Next, a test is carried out to determine whether or not the current field is the last field of the block identified in the image of the reference layer. If the current field is the last field of the block identified in the image of the reference layer, the process proceeds to step 460 that is described hereafter. On the contrary, if the current field is not the last field of the block identified in the image of the reference layer, the second motion field of the block identified in the image of the enhancement layer is obtained (step 465) and the process is branched to step 430 to process the second motion field. It is to be noted that for the second motion field, tests 430 and 445 may be carried out differently (e.g. by using previously stored results of these tests) since this information has already been obtained when processing the first motion field.

Next, if all the blocks of the current image to be encoded have not been processed (step 460), the following 16×16 block is selected (step 490) and the process is repeated.

FIG. 5 illustrates an example of splitting a Coding Tree Block into Coding Units and an exemplary scan order to sequentially process the Coding Units.

It is to be recalled that in the HEVC standard, the block structure is organized by Coding Tree Blocks (CTBs). A picture contains several non-overlapped and square Coding Tree Blocks. The size of a Coding Tree Block can be equal to 64×64 pixels to 16×16 pixels. The size is determined at the sequence level. The most efficient size, in terms of coding efficiency, is the largest one, that is to say 64×64. It is to be noted that all Coding Tree Blocks have the same size except the ones located on the image border (they are arranged in rows). The size of the boundary CTBs is adapted according to the amount of remaining pixels.

Each Coding Tree Block contains one or more square Coding Units (CU). Each Coding Tree Block is split into several Coding Units based on a quad-tree structure. The processing order of each Coding Unit in the Coding Tree Block, for coding or decoding the corresponding CTB, follows the quad-tree structure based on a raster scan order. FIG. 5 shows an example of the processing order of Coding Units generically referenced 500 belonging to one Coding Tree Block 505. The number indicated in each Coding Unit gives the processing order of each corresponding Coding Unit 500 of Coding Tree Block 505.

In HEVC as in the previous standard H.264/AVC, the temporal prediction signal can be weighted by a weight in order, for instance, to better deal with fading or cross-fading images. Another use may be to partially correct mismatch between the colour spaces of an enhancement layer and of the reference layer providing pixel data. Weighted prediction modes are therefore specified to make it possible to weight the predictions based on the reference images. Weighted prediction may be used in uni-prediction (slices of the P type) and bi-prediction (slices of the B type). These modes may apply to any layer in case of scalability.

In HEVC, as in previous standards, in the uni-prediction case, a weighting factor denoted $w_0$ and an offset denoted $o_0$ may be computed from information encoded in the slice header. Conceptually, the prediction signal denoted PRED is defined by the following equation:

$$PRED=MC[REF_0,MV_0]*w_0+o_0$$

where REF is a reference picture, MV the motion vector and MC the motion compensation operation. Here, rounding aspects are not taken into account.

In HEVC as in previous standards, in the b-prediction case, two weighted factors denoted $w_0$ and $w_1$ and two offsets denoted $o_0$ and $o_1$ are computed from information in the slice header. Conceptually, the prediction signal is defined by the following simplified equation where rounding aspects are not taken into account:

$$PRED=(MC[REF_0,MV_0]*w_0+o_0+MC[REF_1,MV_1]*w_1+o_1)/2$$

Turning back to table 1 in the Appendix, signalling of the weighted prediction information is explained. Firstly, it is to be noted that there is a different set of parameters for luma and chroma. It is also to be noted that the weights have fractional precision determined by the denominators denoted luma_log 2 weight_denom and chroma_log 2_weight_denom. For each reference image in the lists L0 and L1, flags luma_weight_lX_flag and chroma_weight_lX_flag (with X being equal to 0 or 1) may be present to signal whether explicit parameters for respectively luma ($w_0$ and $w_1$) and chroma ($o_0$ and $o_1$) are present. If the flags are not present, they are assumed to be 0, meaning that default values for other syntax elements are assumed: a weight of 1 (in fractional representation) and an offset of 0, resulting in the weighted prediction being equal to the prediction of motion compensation. These flags are absent for the current picture when it is used as a reference picture (as can be seen from the check: "if(PicOrderCnt (RefPicList0[i]) !=PicOrderCnt(CurrPic))".

Although such solutions have proven to be efficient, there is a continuous need for optimizing image encoding and decoding, in order to improve quality and/or efficiency, in particular by making it possible to combine efficient provided tools.

SUMMARY OF THE INVENTION

The present invention has been devised to address one or more of the foregoing concerns.

In this context, there is provided a solution for optimizing the use of reference images when encoding images of a video stream according to coding standard such as HEVC.

According to a first object of the invention, there is provided a method for encoding an image of a video stream according to at least one coding mode selected among a plurality of coding modes used to encode images of the video stream, where blocks of the image to be encoded are predicted as a function of at least one reference image from a set of at least one reference image, the at least one reference image comprising at least a reconstructed spatial portion of the image to be encoded and at least a low resolution portion of the image to be encoded, the choice between a reconstructed spatial sub-portion or a low resolution sub-portion to be used for encoding a block of the image to be encoded being determined as a function of a control parameter.

Therefore, the method of the invention makes it possible to use portions of the current image being currently encoded or decoded for encoding of decoding the current image while giving the opportunity to use an interlayer reference image for encoding of decoding the current image.

In an embodiment, the at least one reference image comprising at least a reconstructed spatial portion of the image to be encoded and at least a low resolution portion of the image to be encoded includes a first and a second reference image, the first reference image comprising at least a reconstructed spatial portion of the image to be encoded and the second reference image comprising at least a low resolution portion of the image to be encoded.

In an embodiment, the control parameter comprises information about the order of the first and second reference images in the set of reference images.

In an embodiment, the order of the first and second reference images in the set of reference images is defined as a function of a flag.

In an embodiment, the order of the first and second reference images in the set of reference images is defined as a function of statistics of use, for predicting block of the image to be encoded, of low resolution portions of images and of use of reconstructed spatial portions of images.

In an embodiment, the at least one reference image comprising at least a reconstructed spatial portion of the image to be encoded and at least a low resolution portion of the image to be encoded consists in a single reference image comprising at least a reconstructed spatial portion of the image to be encoded and at least a low resolution portion of the image to be encoded.

In an embodiment, a reconstructed spatial sub-portion of the image to be encoded replaces a low resolution sub-portion in the single reference image after the low resolution sub-portion has been used for encoding at least one block of the image to be encoded.

In an embodiment, the control parameter controls the replacement of low resolution sub-portions of the single reference image by reconstructed spatial sub-portions of the image to be encoded.

In an embodiment, the control parameter is based on motion information associated with a coding unit of the single reference image that is collocated with a coding unit being processed of the image to be encoded.

In an embodiment, a temporal motion vector prediction method is used.

In an embodiment, the use of a single reference image for storing at least a reconstructed spatial portion of the image to be encoded and at least a low resolution portion of the image to be encoded is indicated by at least a flag in the declaration of the use of a low resolution portion of the image to be encoded for encoding the latter.

In an embodiment, blocks of the image to be encoded are predicted as a function of a weighted prediction method based on at least one reference image from the set of at least one reference image, the method further comprising:

determining whether or not a first portion of the image to be encoded, that belongs to the set of at least one reference image, is to be used for encoding at least a second portion of the image to be encoded, the determination being based on a parameter whose value depends on the coding mode to be used for encoding the at least second portion of the image to be encoded; and if the first portion of the image to be encoded, that belongs to the set of at least one reference image, is not to be used for encoding the image to be encoded, signaling weighted prediction information.

In an embodiment, the parameter comprises a flag which is representative of the presence of the first portion of the image to be encoded in the set of at least one reference image.

In an embodiment, the flag is set as a function of flags set before encoding the image to be encoded.

In an embodiment, the flag is a result of a function for comparing at least a portion of the image to be encoded with at least a portion of each images of the set of at least one reference image.

In an embodiment, the parameter comprises a table of flags which is representative of the presence of the first portion of the image to be encoded in the set of at least one reference image, a flag of the table corresponding to each image of the set of at least one reference image.

In an embodiment, the flags are determined as a function of a profile associated with the coding mode.

In an embodiment, the plurality of coding modes used to encode images of the video stream comprises the screen content coding mode.

In an embodiment, the coding modes of the plurality of coding modes comply with the HEVC standard.

According to a second object of the invention, there is provided a method for decoding an image of a video stream as a function of at least one decoding mode selected among a plurality of decoding modes used to decode images of the video stream, where blocks of the image to be decoded are predicted as a function of at least one reference image from a set of at least one reference image, the at least one reference image comprising at least a reconstructed spatial portion of the image to be decoded and at least a low resolution portion of the image to be decoded, the choice between a reconstructed spatial sub-portion or a low resolution sub-portion to be used for decoding a block of the image to be decoded being determined as a function of a control parameter.

Therefore, the method of the invention makes it possible to use portions of the current image being currently encoded or decoded for encoding of decoding the current image while giving the opportunity to use an interlayer reference image for encoding of decoding the current image.

In an embodiment, the at least one reference image comprising at least a reconstructed spatial portion of the image to be decoded and at least a low resolution portion of the image to be decoded includes a first and a second reference image, the first reference image comprising at least a reconstructed spatial portion of the image to be decoded and the second reference image comprising at least a low resolution portion of the image to be decoded.

In an embodiment, the control parameter comprises information about the order of the first and second reference images in the set of reference images.

In an embodiment, the order of the first and second reference images in the set of reference images is defined as a function of a flag.

In an embodiment, the order of the first and second reference images in the set of reference images is defined as a function of statistics of use, for predicting block of the image to be decoded, of low resolution portions of images and of use of reconstructed spatial portions of images.

In an embodiment, the at least one reference image comprising at least a reconstructed spatial portion of the image to be decoded and at least a low resolution portion of the image to be decoded consists in a single reference image comprising at least a reconstructed spatial portion of the image to be decoded and at least a low resolution portion of the image to be decoded.

In an embodiment, a reconstructed spatial sub-portion of the image to be decoded replaces a low resolution sub-portion in the single reference image after the low resolution sub-portion has been used for decoding at least one block of the image to be decoded.

In an embodiment, the control parameter controls the replacement of low resolution sub-portions of the single reference image by reconstructed spatial sub-portions of the image to be decoded.

In an embodiment, the control parameter is based on motion information associated with a coding unit of the single reference image that is collocated with a coding unit being processed of the image to be decoded.

In an embodiment, a temporal motion vector prediction method is used.

In an embodiment, the use of a single reference image for storing at least a reconstructed spatial portion of the image to be decoded and at least a low resolution portion of the image to be decoded is indicated by at least a flag in the declaration of the use of a low resolution portion of the image to be decoded for decoding the latter.

In an embodiment, blocks of the image to be decoded are predicted as a function of a weighted prediction method based on at least one reference image from the set of at least one reference image, the method further comprising:

determining whether or not a first portion of the image to be decoded, that belongs to the set of at least one reference image, is to be used for decoding at least a second portion of the image to be decoded, the determination being based on a parameter whose value depends on the decoding mode to be used for decoding the at least second portion of the image to be decoded; and if the first portion of the image to be decoded, that belongs to the set of at least one reference image, is not to be used for decoding the image to be decoded, signaling weighted prediction information.

In an embodiment, the parameter comprises a flag which is representative of the presence of the first portion of the image to be decoded in the set of at least one reference image.

In an embodiment, the flag is set as a function of flags set before decoding the image to be decoded.

In an embodiment, the flag is a result of a function for comparing at least a portion of the image to be decoded with at least a portion of each images of the set of at least one reference image.

In an embodiment, the parameter comprises a table of flags which is representative of the presence of the first portion of the image to be decoded in the set of at least one reference image, a flag of the table corresponding to each image of the set of at least one reference image.

In an embodiment, the flags are determined as a function of a profile associated with the decoding mode.

In an embodiment, the plurality of decoding modes used to decode images of the video stream comprises the screen content decoding mode.

In an embodiment, the decoding modes of the plurality of decoding modes comply with the HEVC standard.

According to a third object of the invention, there is provided a device comprising a processor configured for encoding an image of a video stream according to at least one coding mode selected among a plurality of coding modes used to encode images of the video stream, where blocks of the image to be encoded are predicted as a function of at least one reference image from a set of at least one reference image, the at least one reference image comprising at least a reconstructed spatial portion of the image to be encoded and at least a low resolution portion of the image to be encoded, the choice between a reconstructed spatial sub-portion or a low resolution sub-portion to be used for encoding a block of the image to be encoded being determined as a function of a control parameter.

Therefore, the device of the invention makes it possible to use portions of the current image being currently encoded or decoded for encoding of decoding the current image while giving the opportunity to use an interlayer reference image for encoding of decoding the current image.

In an embodiment, the at least one reference image comprising at least a reconstructed spatial portion of the image to be encoded and at least a low resolution portion of the image to be encoded includes a first and a second reference image, the first reference image comprising at least a reconstructed spatial portion of the image to be encoded and the second reference image comprising at least a low resolution portion of the image to be encoded.

In an embodiment, the control parameter comprises information about the order of the first and second reference images in the set of reference images.

In an embodiment, the order of the first and second reference images in the set of reference images is defined as a function of a flag.

In an embodiment, the order of the first and second reference images in the set of reference images is defined as a function of statistics of use, for predicting block of the image to be encoded, of low resolution portions of images and of use of reconstructed spatial portions of images.

In an embodiment, the at least one reference image comprising at least a reconstructed spatial portion of the image to be encoded and at least a low resolution portion of the image to be encoded consists in a single reference image comprising at least a reconstructed spatial portion of the image to be encoded and at least a low resolution portion of the image to be encoded.

In an embodiment, a reconstructed spatial sub-portion of the image to be encoded replaces a low resolution sub-portion in the single reference image after the low resolution sub-portion has been used for encoding at least one block of the image to be encoded.

In an embodiment, the control parameter controls the replacement of low resolution sub-portions of the single reference image by reconstructed spatial sub-portions of the image to be encoded.

In an embodiment, the control parameter is based on motion information associated with a coding unit of the single reference image that is collocated with a coding unit being processed of the image to be encoded.

In an embodiment, a temporal motion vector prediction method is used.

In an embodiment, the use of a single reference image for storing at least a reconstructed spatial portion of the image to be encoded and at least a low resolution portion of the image to be encoded is indicated by at least a flag in the declaration of the use of a low resolution portion of the image to be encoded for encoding the latter.

In an embodiment, blocks of the image to be encoded are predicted as a function of a weighted prediction method based on at least one reference image from the set of at least one reference image, the processor being further configured for carrying out the steps of:

determining whether or not a first portion of the image to be encoded, that belongs to the set of at least one reference image, is to be used for encoding at least a second portion of the image to be encoded, the determination being based on a parameter whose value depends on the coding mode to be used for encoding the at least second portion of the image to be encoded; and if the first portion of the image to be encoded, that belongs to the set of at least one reference image, is not to be used for encoding the image to be encoded, signaling weighted prediction information.

In an embodiment, the parameter comprises a flag which is representative of the presence of the first portion of the image to be encoded in the set of at least one reference image.

In an embodiment, the flag is set as a function of flags set before encoding the image to be encoded.

In an embodiment, the flag is a result of a function for comparing at least a portion of the image to be encoded with at least a portion of each images of the set of at least one reference image.

In an embodiment, the parameter comprises a table of flags which is representative of the presence of the first portion of the image to be encoded in the set of at least one reference image, a flag of the table corresponding to each image of the set of at least one reference image.

In an embodiment, the flags are determined as a function of a profile associated with the coding mode.

In an embodiment, the plurality of coding modes used to encode images of the video stream comprises the screen content coding mode.

In an embodiment, the coding modes of the plurality of coding modes comply with the HEVC standard.

According to a fourth object of the invention, there is provided a device comprising a processor configured for decoding an image of a video stream as a function of at least one decoding mode selected among a plurality of decoding modes used to decode images of the video stream, where blocks of the image to be decoded are predicted as a function of at least one reference image from a set of at least one reference image, the at least one reference image comprising at least a reconstructed spatial portion of the image to be decoded and at least a low resolution portion of the image to be decoded, the choice between a reconstructed spatial sub-portion or a low resolution sub-portion to be used for decoding a block of the image to be decoded being determined as a function of a control parameter.

Therefore, the device of the invention makes it possible to use portions of the current image being currently encoded or decoded for encoding of decoding the current image while giving the opportunity to use an interlayer reference image for encoding of decoding the current image.

In an embodiment, the at least one reference image comprising at least a reconstructed spatial portion of the image to be decoded and at least a low resolution portion of the image to be decoded includes a first and a second reference image, the first reference image comprising at least a reconstructed spatial portion of the image to be decoded and the second reference image comprising at least a low resolution portion of the image to be decoded.

In an embodiment, the control parameter comprises information about the order of the first and second reference images in the set of reference images.

In an embodiment, the order of the first and second reference images in the set of reference images is defined as a function of a flag.

In an embodiment, the order of the first and second reference images in the set of reference images is defined as a function of statistics of use, for predicting block of the image to be decoded, of low resolution portions of images and of use of reconstructed spatial portions of images.

In an embodiment, the at least one reference image comprising at least a reconstructed spatial portion of the image to be decoded and at least a low resolution portion of the image to be decoded consists in a single reference image comprising at least a reconstructed spatial portion of the image to be decoded and at least a low resolution portion of the image to be decoded.

In an embodiment, a reconstructed spatial sub-portion of the image to be decoded replaces a low resolution sub-portion in the single reference image after the low resolution sub-portion has been used for decoding at least one block of the image to be decoded.

In an embodiment, the control parameter controls the replacement of low resolution sub-portions of the single reference image by reconstructed spatial sub-portions of the image to be decoded.

In an embodiment, the control parameter is based on motion information associated with a coding unit of the single reference image that is collocated with a coding unit being processed of the image to be decoded.

In an embodiment, a temporal motion vector prediction method is used.

In an embodiment, the use of a single reference image for storing at least a reconstructed spatial portion of the image to be decoded and at least a low resolution portion of the image to be decoded is indicated by at least a flag in the declaration of the use of a low resolution portion of the image to be decoded for decoding the latter.

In an embodiment, blocks of the image to be decoded are predicted as a function of a weighted prediction method based on at least one reference image from the set of at least one reference image, the processor being further configured for carrying out the steps of:

determining whether or not a first portion of the image to be decoded, that belongs to the set of at least one reference image, is to be used for decoding at least a second portion of the image to be decoded, the determination being based on a parameter whose value depends on the decoding mode to be used for decoding the at least second portion of the image to be decoded; and if the first portion of the image to be decoded, that belongs to the set of at least one reference image, is not to be used for decoding the image to be decoded, signaling weighted prediction information.

In an embodiment, the parameter comprises a flag which is representative of the presence of the first portion of the image to be decoded in the set of at least one reference image.

In an embodiment, the flag is set as a function of flags set before decoding the image to be decoded.

In an embodiment, the flag is a result of a function for comparing at least a portion of the image to be decoded with at least a portion of each images of the set of at least one reference image.

In an embodiment, the parameter comprises a table of flags which is representative of the presence of the first portion of the image to be decoded in the set of at least one reference image, a flag of the table corresponding to each image of the set of at least one reference image.

In an embodiment, the flags are determined as a function of a profile associated with the decoding mode.

In an embodiment, the plurality of decoding modes used to decode images of the video stream comprises the screen content decoding mode.

In an embodiment, the decoding modes of the plurality of decoding modes comply with the HEVC standard.

Since the present invention can be implemented in software, the present invention can be embodied as computer readable code for provision to a programmable apparatus on any suitable carrier medium, and in particular a suitable tangible carrier medium or suitable transient carrier medium. A tangible carrier medium may comprise a storage medium such as a floppy disk, a CD-ROM, a hard disk drive, a magnetic tape device or a solid state memory device and the like. A transient carrier medium may include a signal such as an electrical signal, an electronic signal, an optical signal, an acoustic signal, a magnetic signal or an electromagnetic signal, e.g. a microwave or RF signal.

BRIEF DESCRIPTION OF THE DRAWINGS

Embodiments of the invention will now be described, by way of example only, and with reference to the following drawings in which:

FIG. 6, comprising FIGS. 6a and 6b, illustrates schematically the IBC mode and the IBC compared to the inter sub-modes, respectively;

DETAILED DESCRIPTION OF EMBODIMENTS OF THE INVENTION

In view of the demand for coding screen content video, a Screen Content Coding (SCC) extension of HEVC has been developed. This extension takes advantage of the repetitive patterns within the same image. It is based on intra image block copy. Accordingly, the Intra Block Copy (IBC) mode (an additional mode for Screen Content Coding (SCC) extension of HEVC) helps coding graphical elements such as glyphs (i.e., the graphical representation of a character) or traditional GUI elements, which are very difficult to code using traditional intra prediction methods.

According to the IBC mode, a block of pixels in a current image is encoded using a predictor block belonging to the same current image and indicated by a vector associated with the block of pixels. To do so, the signalling of the encoded data (texture residual if any, vector, and vector residual if any) can be made as any of the three inter sub-modes (i.e. Inter (AMVP) mode, Merge mode, and Merge Skip mode). A main difference between the IBC mode and the three inter sub-modes is that the reference picture is the current image in the case of IBC.

FIG. 6, comprising FIGS. 6a and 6b, illustrates schematically the IBC mode and the IBC compared to the inter sub-modes, respectively.

Figure 5:
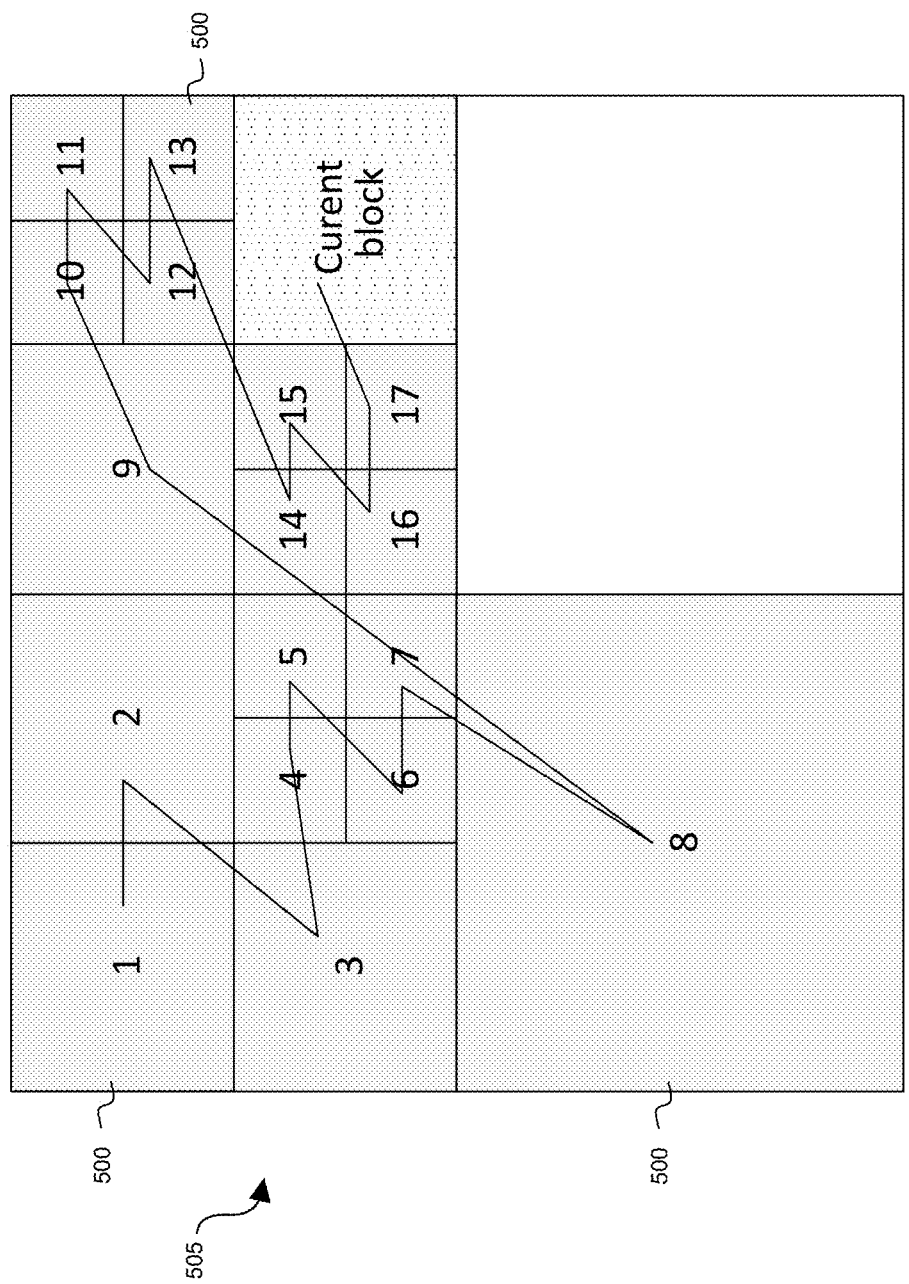
FIG. 5 illustrates an example of splitting a Coding Tree Block into Coding Units and an exemplary scan order to sequentially process the Coding Units.

FIG. 6a illustrates schematically how the Intra Block Copy (IBC) prediction mode works. At a high-level, an image 600 to be encoded is divided into Coding Units that are encoded in raster scan order, as already described by reference to FIG. 5. Thus, when coding block 605, all the blocks of area 610 have already been encoded and their reconstructed version (i.e., the partially decoded blocks, e.g. before carrying out the postfiltering steps 165A or 240A of FIGS. 1 and 2, respectively) can be considered available to the encoder (and the corresponding decoder). Area 610 is called the causal area of the Coding Unit 605. Once Coding Unit 605 is encoded, it belongs to the causal area for the next Coding Unit. This next Coding Unit as well as all the next ones belong to area 615 (dotted area). They cannot be used for coding the current Coding Unit 605. The causal area is constituted by reconstructed blocks.

Information used to encode a given Coding Unit is not the original blocks of the image (this information is not available during decoding). The only information available at the decoding end is the reconstructed version of the blocks of pixels in the causal area, namely the decoded version of these blocks. For this reason, at the encoding end, previously encoded blocks of the causal area are decoded to provide the reconstructed version of these blocks.

Intra Block Copy works by signalling a block 620 in the causal area which should be used to produce a prediction of block 605. For the sake of illustration, the block 620 may be found by using a matching algorithm. In the HEVC Screen Content Extension, this block is indicated by a block vector 625 that is transmitted in the bit-stream.

This block vector is the difference between the coordinates of a particular point of the Coding Unit 605 and the coordinates of the corresponding point in the predictor block 625. The motion vector difference coding consists, for a value d, in coding whether d is zero, and if not, its sign and its magnitude minus 1. In HEVC motion vector difference coding interleaves the x and y components of the vector.

Figure 1:
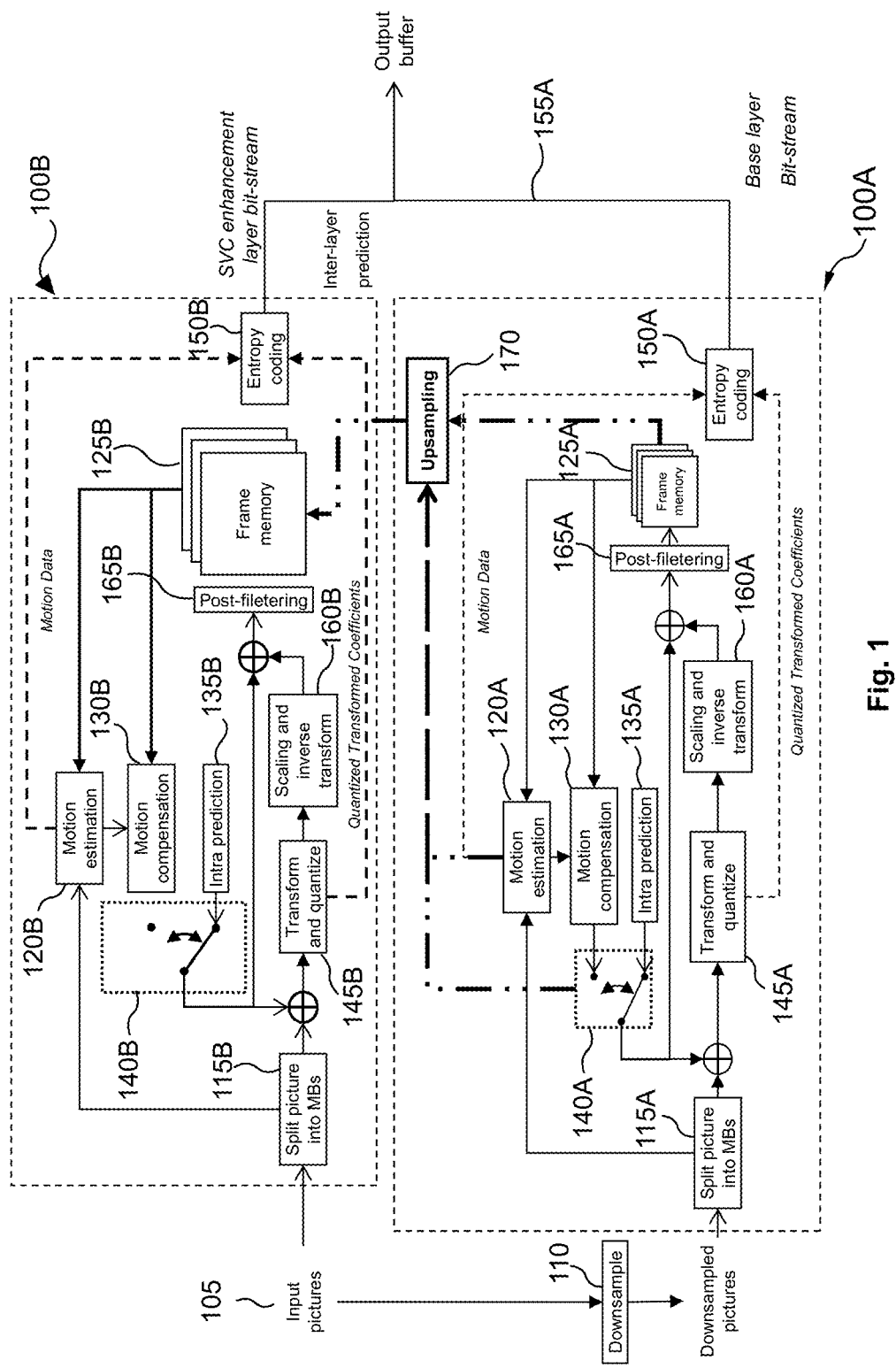
FIG. 1 is a block diagram illustrating an encoder implementing the scalable extension of HEVC.
Figure 2:
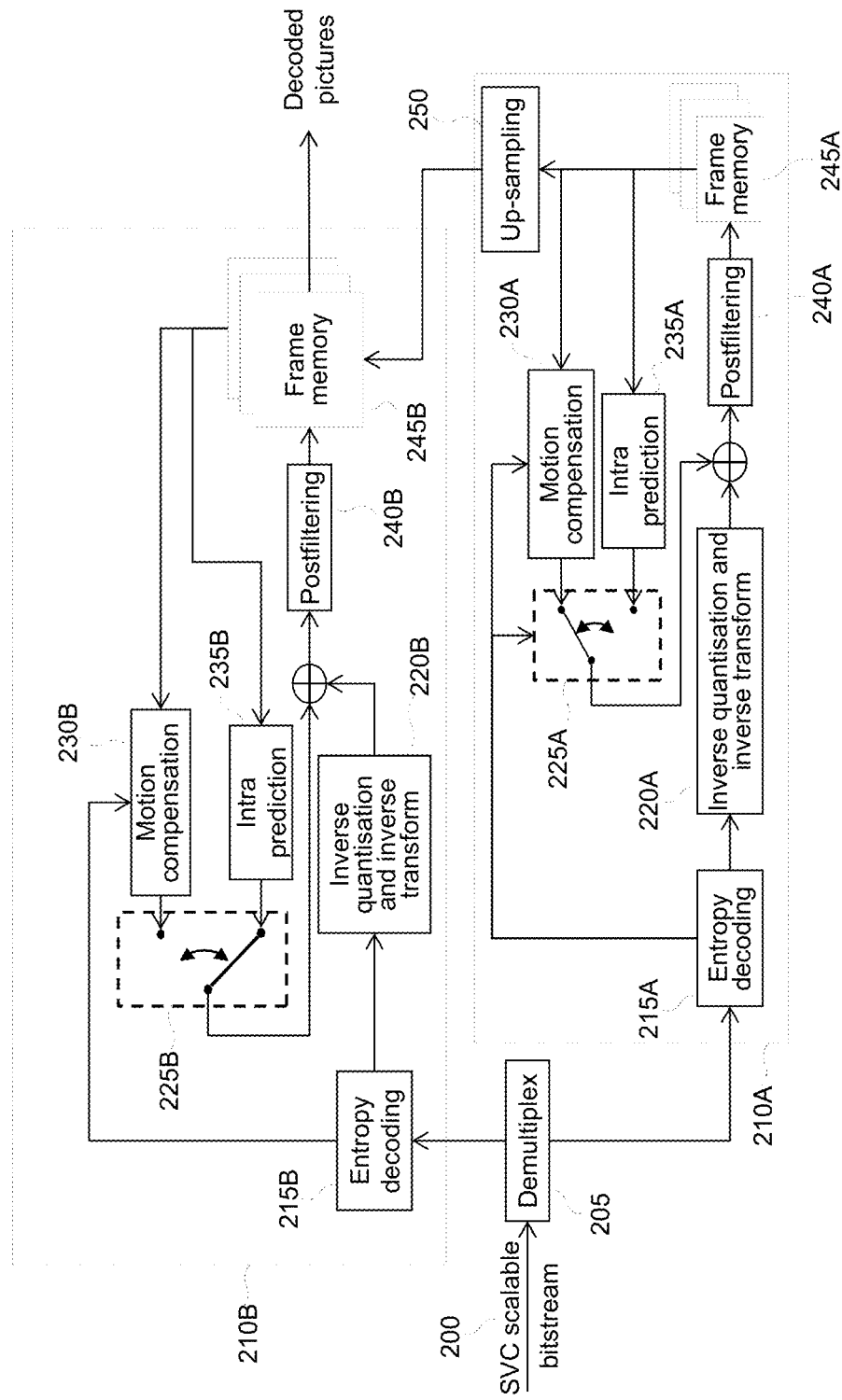
FIG. 2 is a block diagram illustrating an SHVC decoder compliant with a bit-stream such as the one generated by the SHVC encoder illustrated in FIG. 1.

Turning to FIG. 6b, coding or decoding of blocks of image 600 can use a reference list of images 630, for instance located in the image buffer 125A or 125B of FIG. 1 or in the image buffer 245A or 245B of FIG. 2, containing reference images 635, 640, and 600 (i.e. the current picture).

Thus, using the conventional signalling of the inter mode, the IBC mode can be detected by simply checking the reference index for a given list L0 or L1: if it corresponds to the last image in the list, it can be concluded that the IBC mode to code the corresponding pixel block.

A known method to detect the IBC mode consists in comparing the Picture Order Counts (POC) of the current image with the Picture Order Counts of the reference pictures: if they are equal, the IBC mode is used (as set forth, for example, in JCTVC-V1005-v1, section 7.3.6.3, "Weighted prediction parameters syntax"). A table from this section is represented in the Appendix, Table 1, where the method can be seen under such checks as "if(PicOrderCnt (RefPicList0[i]) !=PicOrderCnt(CurrPic))", where CurrPic is the current reference picture.

According to a general embodiment of the invention, the reference image lists that are used for encoding or decoding an image to be encoded or decoded comprise a reconstructed spatial portion of the image to be encoded or decoded as well as a low resolution portion of this image. The choice between a spatial sub-portion or a low resolution sub-portion to be used for encoding or decoding a block of the image to be encoded or decoded is determined as a function of a control parameter.

It is to be noted here that the motion vector of IBC (also known as the block vector) has an integer precision, contrary to vectors for actual motion which can use half-pixel or quarter-pixel precision. However, the concept of copying a block from the causal area is known to be extendable beyond IBC, subject to various enhancements, such as flipping it in the horizontal, or vertical, or both directions, or potentially masking it. In particular, this concept has been used in the coding of natural content (as opposed to the screen content type for IBC), e.g. by using sub-pixel precision or even texture synthesis. As a consequence, it is to be understood that the following embodiments of the invention are not limited to the screen content coding mode (i.e. the use of IBC). Embodiments are directed to prediction methods associated with a particular coding mode that derives prediction from blocks of pixels from the causal area and that it is signalled within a picture reference index. Indeed, whether the pixels are just reconstructed, fully decoded, or more generally, post-filtered using additional data (e.g. to synthesize texture, or to reduce artefacts) does not modify the means used by these embodiments.

Figure 3:
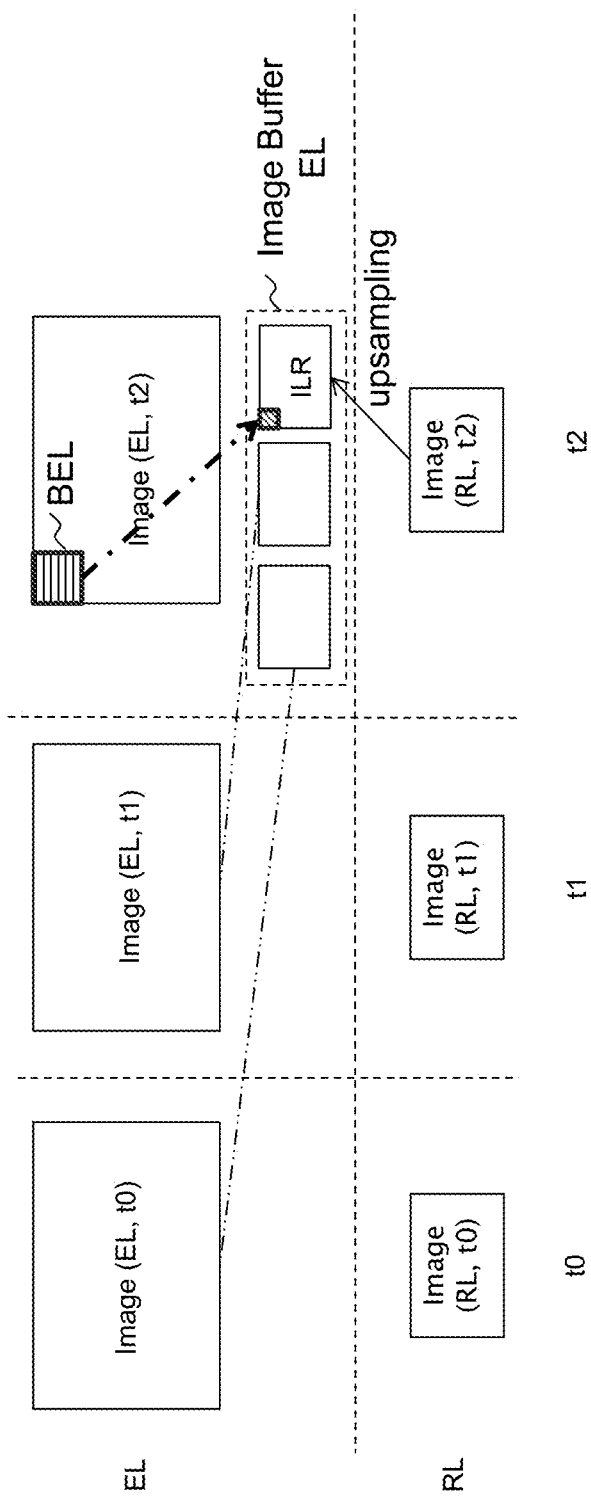
FIG. 3 represents schematically a spatially scalable video sequence compliant with SHVC.
Figure 4:
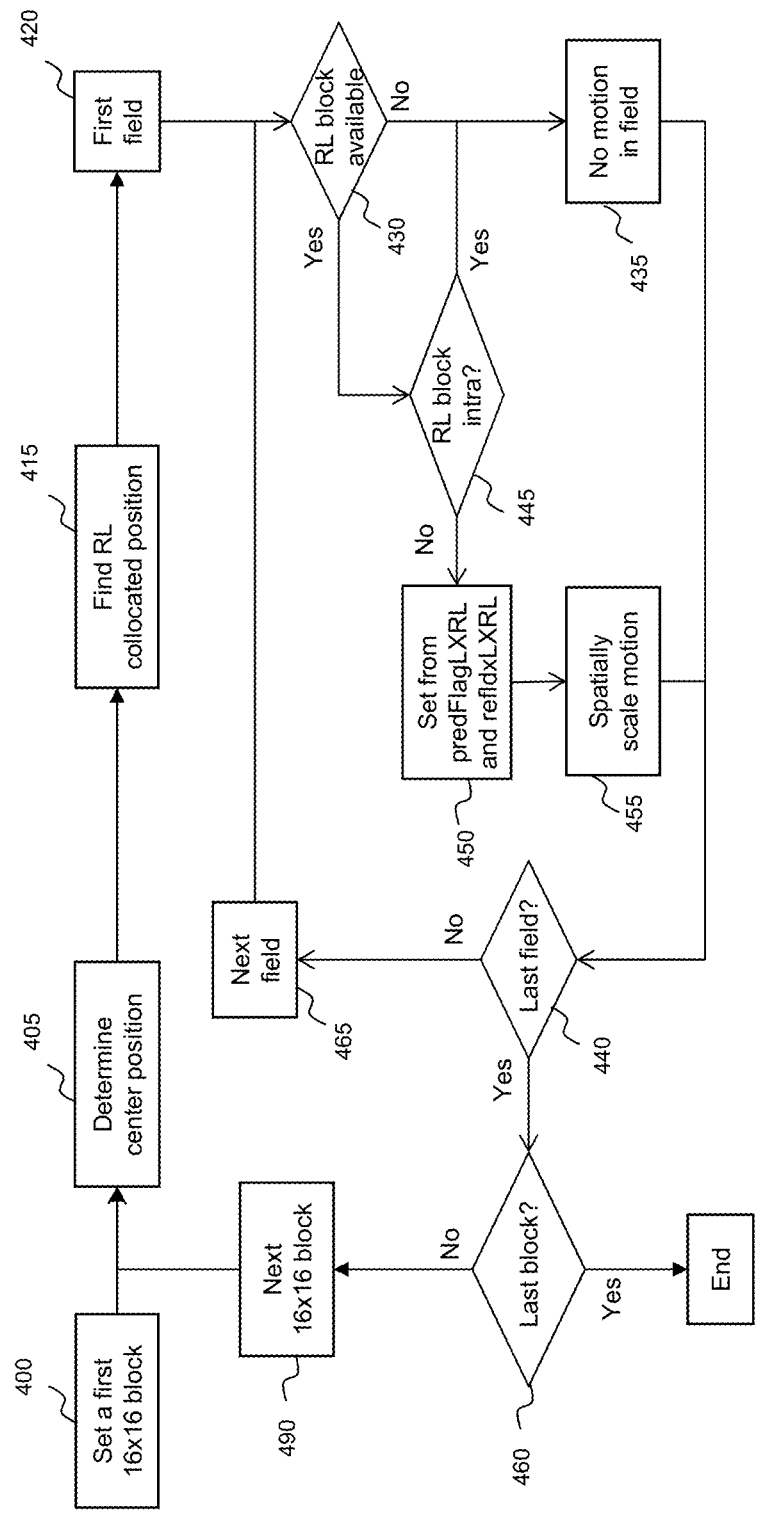
FIG. 4 illustrates steps of a method for deriving motion information from two images: one image of the enhancement layer and one corresponding image of the reference layer.
Figure 7:
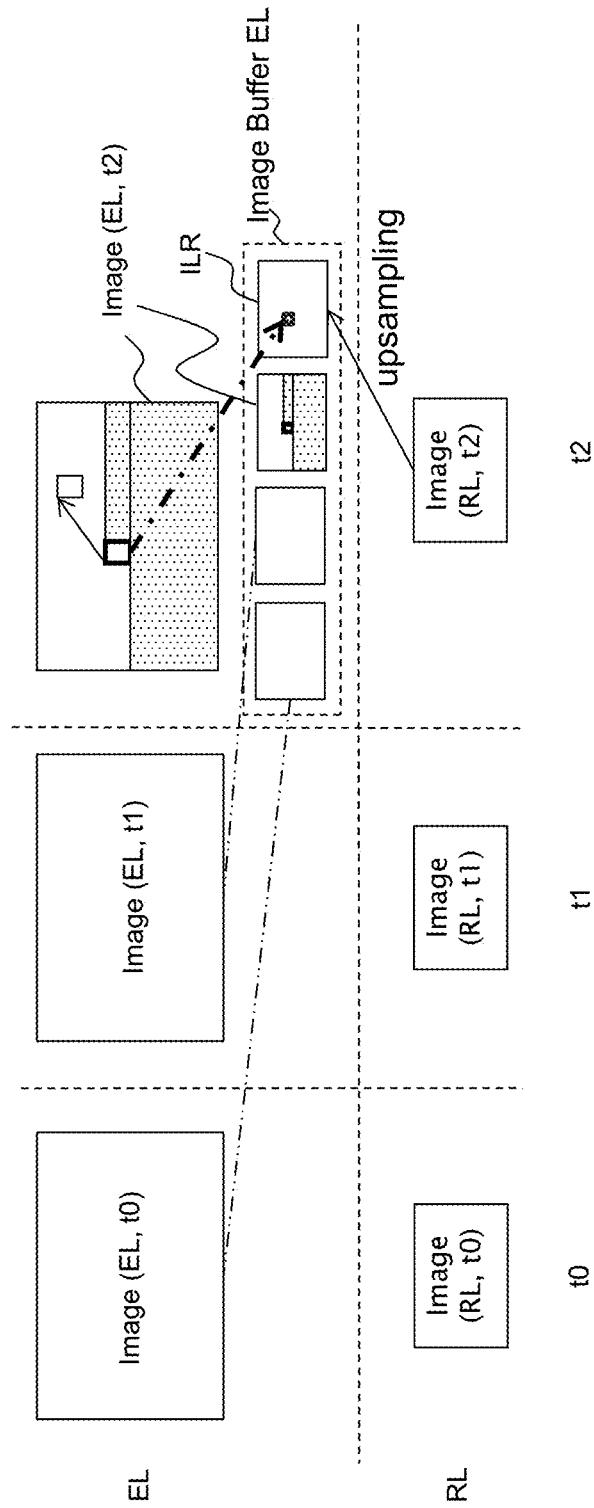
FIG. 7 illustrates a method for encoding or decoding a current image as a function of a set of reference images comprising the current image and an interlayer image.

FIG. 7 illustrates a method for encoding or decoding a current image as a function of a set or list of reference images comprising the current image and an interlayer image. In other words, FIG. 7 presents a way to combine the use of tools found in the SCC and SHVC extensions of HEVC. In particular, an ILR image is inserted according to the operations described in section H.8.3.4 (which actually refers to section F.8.3.4) of document JCTVC-V1005-v1, while the current image is inserted according to the operations described in section 8.3.4 of this document. Like the spatially scalable video sequence compliant with SHVC illustrated in FIG. 3, the spatially scalable video sequence illustrated in FIG. 7 comprises only two layers, for example a reference layer and an enhancement layer, denoted RL and EL respectively. As can be seen in FIG. 7, the images of the enhancement layer, at times t0 and t1, denoted (EL, t0) and (EL, t1), respectively, have been inserted in the image reference buffer of EL layer for use in encoding or decoding the current image (EL, t2).

Next, the current image denoted (EL, t2) is added to the image reference buffer of EL layer.

Finally, the inter-layer image (ILR) that results from up-sampling the image denoted (RL, t2) is added to the image reference buffer of EL layer.

Accordingly, the images (EL, t0) and (EL, t1) of the enhancement layer, the current image (EL, t2), and the inter-layer image (ILR), belong to the reference lists L0 and/or L1.

Table 2 in the Appendix presents an example of adaptation of the specification to perform those operations in a generic way while keeping the semantics of document JCTVC-V1005-v1.

According to this embodiment, the PPS-level flag denoted "pps_curr_pic_ref_enabled_flag" is checked, for a list X (X having the value 0 or 1) and its counterpart Y (Y having thus the value 1 or 0), so as to verify whether to add the current picture denoted "currPic" to the temporary reference picture list denoted "RefPicListTempX". Then, the interlayer images denoted "RefPicSetinterLayerY[i]", "NumActiveRefLayerPicsY" representing the number of these images (potentially different from 1), are added at the end of the temporary list:

for(i=0; i<NumActiveRefLayerPicsY; rIdx++, i++)
RefPicListTempX[rIdx]=RefPicSetInterLayery[i]

At the end of building the temporary lists, that may involve other operations, list "RefPicListTempX" contains "num_ref_idx_lX_active_minus1" pictures. These pictures are copied into the actual final reference picture lists according to reference picture list modification information (flags "ref_pic_list_modification_flag_lX" and arrays "list_entry_lX[i]") that contains the reordered picture indexes, being part of the slice header, as described in section F.8.3.4 of document JCTVC-V1005-v1:

for(rIdx=0; rIdx<=num_ref_idx_l1_active_minusX; rIdx++)
RefPicListX[rIdx]=ref_pic_list_modification_flag_lX
? RefPicListTempX[list_entry_lX[rIdx]]:
:RefPicListTempX[rIdx]

The intent here is to give priority to the use of IBC over the use of ILR, which is expected to be more useful with screen content.

However, if the sequence contains more natural content then this choice is detrimental. Therefore, according to another embodiment, the order of the ILR and IBC images is selected based on a criterion that can be either explicit or implicit. Such a criterion may be signalled, for example, by a flag (conditionally written depending on the signalling leading to the insertion of the current image and of the interlayer reference image) at the slice, picture parameter set (PPS), or sequence parameter set (SPS) levels, e.g. if "pps_curr_pic_ref_enabled_flag" is set to 1, among other possibilities. It is therefore an explicit criterion. It can also depend, for example, on statistics gathered by both the encoder and the decoder.

Such statistics can be the number of pixels or prediction blocks referring an ILR or the current image, with the goal of placing first the more frequently referred ones. Another example of implicit signalling is obviously when either IBC or pixel prediction through an ILR is disabled. Another case is, so as to match the image order in the DPB of the RL, to always place the current image before the ILR ones if the RL uses IBC itself. In such a case, the MVs of the RL pointing to the current RL frame can therefore be reused simply for motion prediction in the EL, including for the current picture of the EL. All these cases illustrate implicit signalling according to properties/coding parameters of the various layers.

It is to be noted here that similar concepts of specifying an implicit or an explicit order may also apply to the Multi-View and 3D extensions of HEVC.

It is to be noted that such embodiments may present drawbacks under some circumstances since it requires multiple additional image buffers, therefore incurring a higher use of memory and also increasing the bit-rate due to the increase in signalling the reference indexes.

Figure 8:
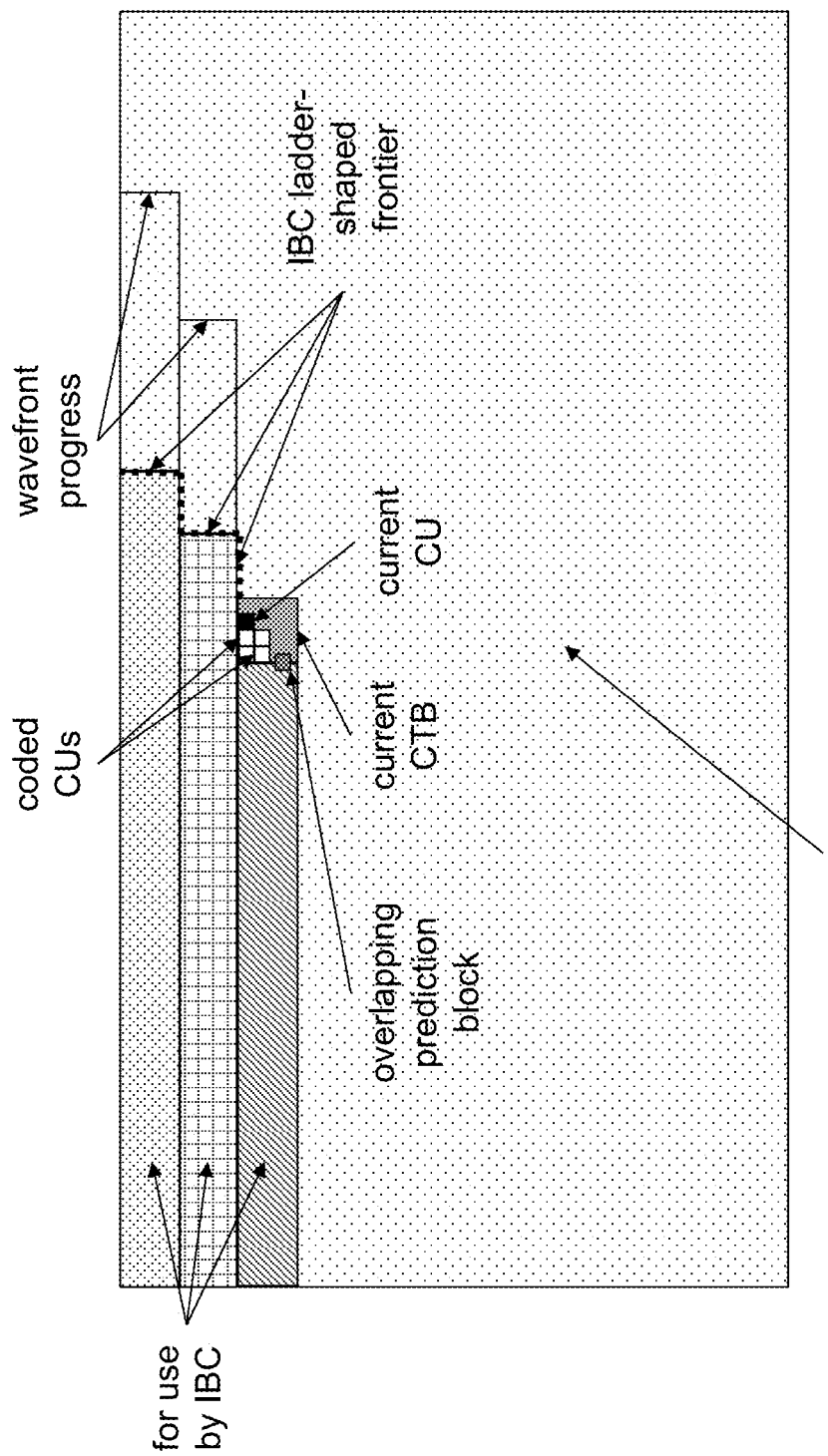
FIG. 8 illustrates a particular embodiment according to which a single reference image is used for handling a current image and an interlayer reference image.

To alleviate these drawbacks, interlayer reference image (ILR) data and data of the currently processed image, for example data of the IBC, may be merged in the same image, as illustrated in FIG. 8, wherein decoded data are written in an interlayer reference image.

FIG. 8 illustrates this embodiment according to which a single reference image is used for handling a current image and an interlayer reference image. A first issue to solve when merging data from a current image and with data from an interlayer reference image is that the current image, for example the IBC, is constrained in the available reference data. Indeed, a tool known as "Wavefront Parallel Processing" allows processing lines of at least one CTB in relative parallel fashion. According to this tool, decoding CUs in a given CTB only requires that the CTB above the considered CTB is decoded.

Such a decoding synchronization can be observed in FIG. 8 as the ladder-shaped wavefront progress marks. Accordingly, the causal area from the SCC extension (as described by reference to FIG. 3) is thus limited. Therefore, processing a current CU (e.g. the CU represented in black in FIG. 8) requires that a used prediction block (e.g. the referenced overlapping prediction block) must not overlap unreconstructed parts of the current CTB and must not overlap the area right and below of the ladder-shaped frontier resulting from CTB decoding.

Since the decoding progress of the CTB rows is difficult to determine, the availability of ILR data in the forbidden part may be uncertain. This may result in synchronization issues, known as deadlocks: decoding a current CU depends on data of an area whose decoding depends on whether current CU has been decoded.

Therefore, according to a particular embodiment, ILR data can be obtained only from the current CTB whose decoding is supposed to be serial. Accordingly, the referenced overlapping prediction block in FIG. 8 would be allowed, as well as the ILR data exactly collocated at the CU location (i.e., whose motion vector is (0, 0)). Effectively, any block can access the available area as defined in the SCC extension, as well as current CTB, which is a mix of IBC reference data and ILR data.

In yet another embodiment, a prediction block can overlap both the IBC (i.e. causal area) and ILR reference data (preferably only from the current CTB): this allows prediction from pixels being located outside the causal area and improves coding efficiency.

Merging IBC and ILR data leads to various implications. Firstly, according to a particular embodiment, Constrained Intra Prediction may be modified to get data from the causal area or the area made of the causal area and the ILR data made available. Secondly, motion prediction is modified. Indeed, temporal motion vector prediction (TMVP) is disabled for IBC while allowed for ILR, the former because the current image cannot yet contain motion information for the current block. In a particular embodiment and when ILR and IBC data are merged, TMVP may be allowed since motion data are available. It is to be noted that the current concept and method of TMVP is clearly specified, the solution is similarly applicable to other concepts of temporal motion vector prediction or prediction through the causal area of the current image.

Signalling the merge of ILR image data with IBC picture data may be part of the Reference Picture List Management (RPLM), following the semantics of high-level syntax.

According to a particular embodiment it is signalled with the declaration of the insertion of such an ILR image. It is to be recalled that, with reference to document JCTVC-V1005-v1, the declaration of an ILR involves:

The number of direct reference layers denoted "NumDirectRefLayers" for the current layer (as defined by the video parameter set (VPS) semantics in e.g. section F.7.4.3.1.1), which thus requires signalling a default value for the merge operation; and The number of active ILR images denoted "num_inter_layer_ref_pics_minus1" in the slice header (as defined in section F.7.3.6.1).

These two parameters make it possible to determine the maximum number of flags to be read from the bit-stream to determine which ILR picture is to be used when merging the data.

Since only one ILR image can be merged, it is to be noted that signalling which ILR image is to be used for merging may be optimized, for example as follows:

By not writing the last flag if all previous ones indicate that the respective ILR images are not merged, it may be concluded that the last ILR picture is implicitly merged; and By not writing any flag after a flag indicating that an ILR image is to be merged has been written.

While the previous embodiments are directed to merging of data from a current image to be encoded or decoded and of data from an interlayer reference image, they can be combined with signalling weighted prediction information.

Tables 3, 4, 5, and 6 in Appendix illustrate various embodiments of specific signaling of the weighted prediction method according to embodiments of the invention.

According to the embodiment illustrated in Table 3 and in order not to accidentally deactivate the weighted prediction method when an ILR picture is to be used for encoding a block, a test is carried out to determine whether or not the current image has actually been added to the reference list.

This is advantageously performed by checking the flags denoted "CurrPicInList0Flag" and "CurrPicInList1Flag" associated with reference image lists L0 and L1, respectively. The derivation of these flags is described in the HEVC SCC specifications, currently document JCTVC-V1005. For the sake of illustration, they can be derived from the syntax element denoted "pps_curr_pic_ref_enabled_flag". Indeed, if a slice refers a PPS with this flag set then the current image is inserted as reference in either L0 or L1 list. As a consequence, "pps_curr_pic_ref_enabled_flag" may be used instead of these flags, depending on external factors (availability of the "pps_curr_pic_ref_enabled_flag" flag at this level, etc. . . . ). As a result, a very similar embodiment only checking pps_curr_pic_ref_enabled_flag is illustrated in Table 6, demonstrating how various syntax elements can be used to perform equivalent checks.

However, such an embodiment may present some limits, for example when both an ILR image and the current image are present in the same reference list as described by reference to FIG. 7. This issue can be solved by a solution such as the one illustrated in Table 4. According to this embodiment, determining whether the current image belongs to the reference image list (L0 or L1) is based on a function denoted "isCurrDecPic( )" that compares the current image with the images of the selected list of reference images. Basically, the "isCurrDecPic( )" function returns true if the current image is the same as the selected image of the reference image list. If the equality operator "==" is defined for images, given a reference image "refPic" and the current image "currPic", this can be simplified to "refPic==currPic".

In any case, if the "isCurrDecPic( )" function returns true, weighted prediction information shall not be read. The name of the function is given for sake of illustration. It may be different (e.g. "hasWeightInformation( )".

Accordingly, weighted prediction information shall be read for an ILR picture, whose time instant (POC) is the same as the current picture.

In some circumstances, the embodiment described by reference to Table 4 may present drawbacks. For example, when several ILR images are used as reference images but not all can be used for pixel prediction, signaling weighted prediction method for the ones not usable for pixel prediction is inefficient. Furthermore, depending on the profile and the explicit or implicit parameters of that profile, the previously defined function may not be specifiable, e.g. because it lacks temporary data generated when parsing said parameters.

To alleviate this, as well as for the case where a current image would be merged with an ILR image, as described by reference to FIG. 8, the embodiment illustrated in Table 5 can be used. According to this embodiment, a table of flags is produced per reference list. For the sake of illustration, the tables denoted "IsSecondVersionOfCurrDecPicForL0" and "IsSecondVersionOfCurrDecPicForL1" are created for the reference picture lists L0 and L1, respectively. Each flag of a table is associated with its corresponding image, having the same index in the corresponding reference image list. Their content can then be generated according to the profiles and their parameters. For example, the content of these tables may be defined as follows:

for core HEVC (e.g. Main or Main10), Range Extension (e.g. 4:4:4 8 or 10 bits), and SHVC profiles (Scalable Main and Scalable Main10), the tables are filed with '0' (i.e. false) that means that weighted prediction information shall always be read; and or any SCC profile or similar profiles, the tables may hold a '1' (i.e. true) for the current reference picture, provided it has been inserted in the corresponding reference image list.

For a profile corresponding to the embodiment illustrated in FIG. 8, there are more parameters to take into account. Indeed, how weighted prediction on the ILR is useful depends, for instance, on the color spaces as defined in the rules. In one embodiment, the value of the flag in the tables is therefore inferred from parameters such as the bit-depth or the color space. However, it is to be noted that such information is in the video usability information (VUI) part of the SPS which is not required for decoding. Therefore, according to another embodiment, another flag at the VPS, SPS, or PPS level explicitly signals whether to set the flag (and thus whether to read weighted prediction information).

In yet another embodiment, there are actually different "virtual" reference images, but the pixel data buffer is shared. This allows using different weighted prediction parameters by changing the selected reference image. However, when a prediction block actually overlaps IBC and ILR data, whether to use weighted prediction may be difficult to solve. Therefore in yet another embodiment, instead, the current CTB cannot be referenced for prediction through IBC.

In all previous embodiments, names have been selected according to the context, but the man skilled in the art should recognize the purpose of similar tables but with differing naming. For instance, another name for the flag denoted "IsSecondVersionOfCurrDecPicForL0" could be "hasWeightinformationL0".

Figure 9:
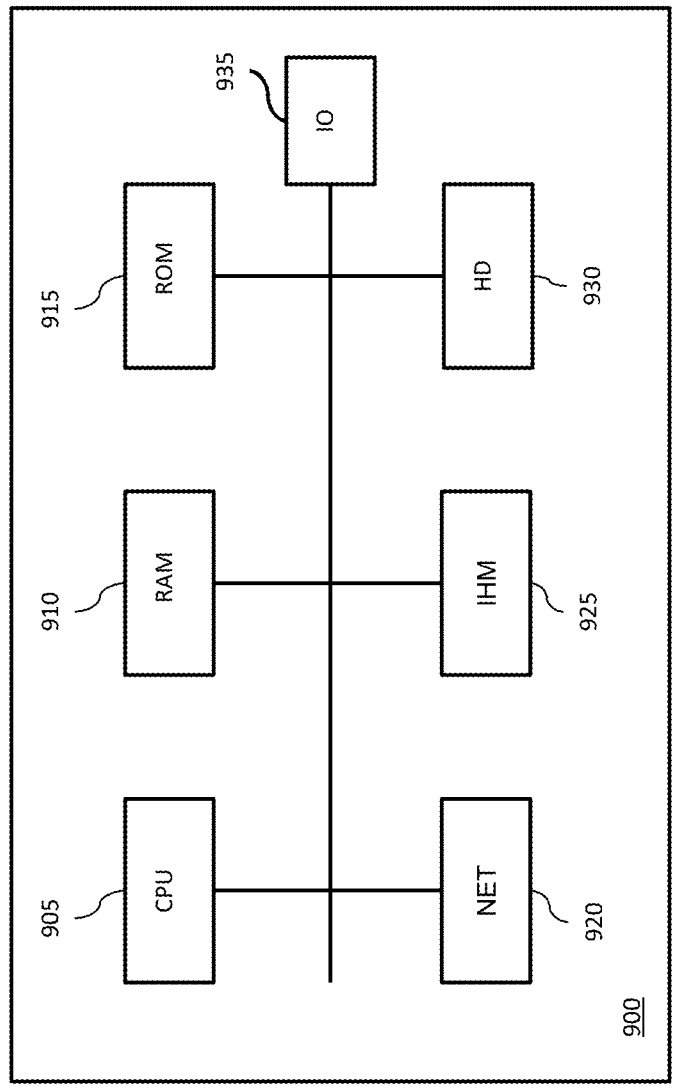
FIG. 9 is a schematic block diagram of a computing device for implementation of one or more embodiments of the invention.

FIG. 9 is a schematic block diagram of a computing device 900 for implementation of one or more embodiments of the invention.

The apparatus may be an acquisition device such as a camera or a display device with or without communication capabilities. Reference numeral 910 is a RAM which functions as a main memory, a work area, etc., of Central Processing Unit (CPU) 905. CPU 905 is capable of executing instructions on powering up of the apparatus from program ROM 915. After the powering up, CPU 905 is capable of executing instructions from the main memory 910 relating to a software application after those instructions have been loaded from the program ROM 915 or the hard-disc (HD) 930 for example. Such software application, when executed by the CPU 905, causes the steps described by reference to FIGS. 7 and 8 and by reference to Table 3, 4, and 5 to be performed.

Reference numeral 920 represents a network interfaces that can be a single network interface or composed of a set of different network interfaces like for instance several wireless interfaces, or different kinds of wired or wireless interfaces. Reference numeral 925 represents a user interface to display information to, and/or receive inputs from, a user. I/O module 935 represents a module able to receive or send data from/to external devices as video sensors or display devices.

While the invention has been illustrated and described in detail in the drawings and foregoing description, such illustration and description are to be considered illustrative or exemplary and not restrictive, the invention not being restricted to the disclosed embodiment. Other variations to the disclosed embodiment can be understood and effected by those skilled in the art in practicing the claimed invention, from a study of the drawings, the disclosure and the appended claims. It is to be noted that resources or main resources may be sub-resources of other resources and that sub-resources or auxiliary resources may be requested as main resources.

In the claims, the word "comprising" does not exclude other elements or steps, and the indefinite article "a" or "an" does not exclude a plurality. A single processor or other unit may fulfil the functions of several items recited in the claims. The mere fact that different features are recited in mutually different dependent claims does not indicate that a combination of these features cannot be advantageously used. Any reference signs in the claims should not be construed as limiting the scope of the invention.

APPENDIX

TABLE 1

| | Descriptor |
|---|---|
| pred_weight_table( ) { | |
|   luma_log2_weight_denom | ue(v) |
|   if( ChromaArrayType != 0 ) | |
|     delta_chroma_log2_weight_denom | se(v) |
|   for( i = 0; i <= num_ref_idx_l0_active_minus1; i++ ) | |
|     if( PicOrderCnt( RefPicList0[ i ] ) != PicOrderCnt( CurrPic ) ) | |
|       luma_weight_l0_flag[ i ] | u(1) |
|   if( ChromaArrayType != 0 ) | |
|     for( i = 0; i <= num_ref_idx_l0_active_minus1; i++ ) | |
|       if( PicOrderCnt(RefPicList0[ i ]) != PicOrderCnt( CurrPic ) ) | |
|         chroma_weight_l0_flag[ i ] | u(1) |
|   for( i = 0; i <= num_ref_idx_l0_active_minus1; i++ ) { | |
|     if( luma_weight_l0_flag[ i ] ) { | |
|       delta_luma_weight_l0[ i ] | se(v) |
|       luma_offset_l0[ i ] | se(v) |
|     } | |
|     if( chroma_weight_l0_flag[ i ] ) | |
|       for( j = 0; j < 2; j++ ) { | |
|         delta_chroma_weight_l0[ i ][ j ] | se(v) |
|         delta_chroma_offset_l0[ i ][ j ] | se(v) |
|       } | |
|   } | |
|   if( slice_type = = B ) { | |
|     for( i = 0; i <= num_ref_idx_l1_active_minus1; i++ ) | |
|       if( PicOrderCnt(RefPicList0[ i ]) != PicOrderCnt( CurrPic ) ) | |
|         luma_weight_l1_flag[ i ] | u(1) |
|     if( ChromaArrayType != 0 ) | |
|       for( i = 0; i <= num_ref_idx_l1_active_minus1; i++ ) | |
|         if( PicOrderCnt(RefPicList0[ i ]) != PicOrderCnt( CurrPic ) ) | |
|           chroma_weight_l1_flag[ i ] | u(1) |
|     for( i = 0; i <= num_ref_idx_l1_active_minus1; i++ ) { | |
|       if( luma_weight_l1_flag[ i ] ) { | |
|         delta_luma_weight_l1[ i ] | se(v) |
|         luma_offset_l1[ i ] | se(v) |
|       } | |
|       if( chroma_weight_l1_flag[ i ] ) | |
|         for( j = 0; j < 2; j++ ) { | |
|           delta_chroma_weight_l1[ i ][ j ] | se(v) |
|           delta_chroma_offset_l1[ i ][ j ] | se(v) |
|         } | |
|     } | |
|   } | |
| } | |

TABLE 2

```
rIdx = 0
while( rIdx < NumRpsCurrTempListX ) {
    for( i = 0; i < NumPocStCurrBefore && rIdx < NumRpsCurrTempListX; rIdx++, i++ )
        RefPicListTemp0[ rIdx ] = RefPicSetStCurrBefore[ i ]
    for( i = 0; i < NumPocStCurrAfter && rIdx < NumRpsCurrTempListX; rIdx++, i++ )
        RefPicListTemp0[ rIdx ] = RefPicSetStCurrAfter[ i ]
    for( i = 0; i < NumPocLtCurr && rIdx < NumRpsCurrTempListX; rIdx++, i++ )
        RefPicListTempX[ rIdx ] = RefPicSetLtCurr[ i ]
    if( pps_curr_pic_ref_enabled_flag )
        RefPicListTempX[ rIdx++ ] = currPic
    for( i = 0; i < NumActiveRefLayerPicsY; rIdx++, i++ )
        RefPicListTempX[ rIdx ] = RefPicSetInterLayerY[ i ]
}
```

TABLE 3

```
pred_weight_table( ) {                                                          Descriptor
    luma_log2_weight_denom                                                      ue(v)
    if( ChromaArrayType != 0 )
        delta_chroma_log2_weight_denom                                          se(v)
    for( i = 0; i <= num_ref_idx_l0_active_minus1; i++ )
        if( CurrPicInList0Flag &&
                PicOrderCnt( RefPicList0[ i ] ) != PicOrderCnt( CurrPic ) )
            luma_weight_l0_flag[ i ]                                            u(1)
    if( ChromaArrayType != 0 )
        for( i = 0; i <= num_ref_idx_l0_active_minus1; i++ )
            if( CurrPicInList0Flag &&
                    PicOrderCnt( RefPicList0[ i ] ) != PicOrderCnt( CurrPic ) )
                chroma_weight_l0_flag[ i ]                                      u(1)
    for( i = 0; i <= num_ref_idx_l0_active_minus1; i++ ) {
        if( luma_weight_l0_flag[ i ] ) {
            delta_luma_weight_l0[ i ]                                           se(v)
            luma_offset_l0[ i ]                                                 se(v)
        }
        if( chroma_weight_l0_flag[ i ] )
            for( j = 0; j < 2; j++ ) {
                delta_chroma_weight_l0[ i ][ j ]                                se(v)
                delta_chroma_offset_l0[ i ][ j ]                                se(v)
            }
    }
    if( slice_type = = B ) {
        for( i = 0; i <= num_ref_idx_l1_active_minus1; i++ )
            if( CurrPicInList1Flag &&
                    PicOrderCnt( RefPicList1[ i ] ) != PicOrderCnt( CurrPic ) )
                luma_weight_l1_flag[ i ]                                        u(1)
        if( ChromaArrayType != 0 )
            for( i = 0; i <= num_ref_idx_l1_active_minus1; i++ )
                if( CurrPicInList1Flag &&
                        PicOrderCnt( RefPicList1[ i ] ) != PicOrderCnt( CurrPic ) )
                    chroma_weight_l1_flag[ i ]                                  u(1)
        for( i = 0; i <= num_ref_idx_l1_active_minus1; i++ )
        {
            if( luma_weight_l1_flag[ i ] ) {
                delta_luma_weight_l1[ i ]                                       se(v)
                luma_offset_l1[ i ]                                             se(v)
            }
            if( chroma_weight_l1_flag[ i ] )
                for( j = 0; j < 2; j++ ) {
                    delta_chroma_weight_l1[ i ][ j ]                            se(v)
                    delta_chroma_offset_l1[ i ][ j ]                            se(v)
                }
        }
    }
}
```

TABLE 4

```
pred_weight_table( ) {                                                          Descriptor
    luma_log2_weight_denom                                                      ue(v)
    if( ChromaArrayType != 0 )
        delta_chroma_log2_weight_denom                                          se(v)
    for( i = 0; i <= num_ref_idx_l0_active_minus1; i++ )
        if( !isCurrDecPic( RefPicList0[i] ))
            luma_weight_l0_flag[ i ]                                            u(1)
    if( ChromaArrayType != 0 )
        for( i = 0; i <= num_ref_idx_l0_active_minus1; i++ )
            if( !isCurrDecPic( RefPicList0[i] ) )
                chroma_weight_l0_flag[ i ]                                      u(1)
    for( i = 0; i <= num_ref_idx_l0_active_minus1; i++ )
        if( luma_weight_l0_flag[ i ] ) {
```

TABLE 4-continued

```
                                                                                Descriptor
            delta_luma_weight_l0[ i ]                                           se(v)
            luma_offset_l0[ i ]                                                 se(v)
        }
        if( chroma_weight_l0_flag[ i ] )
            for( j = 0; j < 2; j++ ) {
                delta_chroma_weight_l0[ i ][ j ]                                se(v)
                delta_chroma_offset_l0[ i ][ j ]                                se(v)
            }
    }
    if( slice_type = = B ) {
        for( i = 0; i <= num_ref_idx_l1_active_minus1; i++ )
            if( !isCurrDecPic( RefPicList1[i] ))
                luma_weight_l1_flag[ i ]                                        u(1)
        if( ChromaArrayType != 0 )
            for( i = 0; i <= num_ref_idx_l1_active_minus1; i++ )
                if( !isCurrDecPic( RefPicList1[i] ))
                    chroma_weight_l1_flag[ i ]                                  u(1)
        for( i = 0; i <= num_ref_idx_l1_active_minus1; i++ )
        {
            if( luma_weight_l1_flag[ i ] ) {
                delta_luma_weight_l1[ i ]                                       se(v)
                luma_offset_l1[ i ]                                             se(v)
            }
            if( chroma_weight_l1_flag[ i ] )
                for( j = 0; j < 2; j++ ) {
                    delta_chroma_weight_l1[ i ][ j ]                            se(v)
                    delta_chroma_offset_l1[ i ][ j ]                            se(v)
                }
        }
    }
}
```

TABLE 5

```
pred_weight_table( ) {                                                          Descriptor
    luma_log2_weight_denom                                                      ue(v)
    if( ChromaArrayType != 0 )
        delta_chroma_log2_weight_denom                                          se(v)
    for( i = 0; i <= num_ref_idx_l0_active_minus1; i++ )
        if( IsSecondVersionOfCurrDecPicForL0[i] )
            luma_weight_l0_flag[ i ]                                            u(1)
    if( ChromaArrayType != 0 )
        for( i = 0; i <= num_ref_idx_l0_active_minus1; i++ )
            if( IsSecondVersionOfCurrDecPicForL0[i] )
                chroma_weight_l0_flag[ i ]                                      u(1)
    for( i = 0; i <= num_ref_idx_l0_active_minus1; i++ ) {
        if( luma_weight_l0_flag[ i ] ) {
            delta_luma_weight_l0[ i ]                                           se(v)
            luma_offset_l0[ i ]                                                 se(v)
        }
        if( chroma_weight_l0_flag[ i ] )
            for( j = 0; j < 2; j++ ) {
                delta_chroma_weight_l0[ i ][ j ]                                se(v)
                delta_chroma_offset_l0[ i ][ j ]                                se(v)
            }
    }
    if( slice_type = = B ) {
        for( i = 0; i <= num_ref_idx_l1_active minus1; i++ )
            if( IsSecondVersionOfCurrDecPicForL1[i] )
                luma_weight_l1_flag[ i ]                                        u(1)
        if( ChromaArrayType != 0 )
            for( i = 0; i <= num_ref_idx_l1_active_minus1; i++ )
                if( IsSecondVersionOfCurrDecPicForL1[i] )
                    chroma_weight_l1_flag[ i ]                                  u(1)
        for( i = 0; i <= num_ref_idx_l1_active_minus1; i++ )
        {
            if( luma_weight_l1_flag[ i ] ) {
```

TABLE 5-continued

|  | Descriptor |
|---|---|
|             delta_luma_weight_l1[ i ] | se(v) |
|             luma_offset_l1[ i ] | se(v) |
|           } |  |
|         if( chroma_weight_l1_flag[ i ] ) |  |
|            for( j = 0; j < 2; j++ ) { |  |
|                 delta_chroma_weight_l1[ i ][ j ] | se(v) |
|                 delta_chroma_offset_l1[ i ][ j ] | se(v) |
|            } |  |
|         } |  |
|     } |  |
| } |  |

TABLE 6

|  | Descriptor |
|---|---|
| pred_weight_table( ) { |  |
|     luma_log2_weight_denom | ue(v) |
|     if( ChromaArrayType != 0 ) |  |
|         delta_chroma_log2_weight_denom | se(v) |
|     for( i = 0; i <= num_ref_idx_l0_active_minus1; i++ ) |  |
|         if( pps_curr_pic_ref_enabled_flag && |  |
|             PicOrderCnt( RefPicList0[ i ] ) != PicOrderCnt( |  |
|             CurrPic ) ) |  |
|             luma_weight_l0_flag[ i ] | u(1) |
|     if( ChromaArrayType != 0 ) |  |
|         for( i = 0; i <= num_ref_idx_l0_active_minus1; i++ ) |  |
|             if( pps_curr_pic_ref_enabled_flag && |  |
|                 PicOrderCnt( RefPicList0[ i ] ) != |  |
|                 PicOrderCnt( CurrPic ) ) |  |
|                 chroma_weight_l0_flag[ i ] | u(1) |
|     for( i = 0; i <= num_ref_idx_l0_active_minus1; i++ ) { |  |
|         if( luma_weight_l0_flag[ i ] ) { |  |
|             delta_luma_weight_l0[ i ] | se(v) |
|             luma_offset_l0[ i ] | se(v) |
|         } |  |
|         if( chroma_weight_l0_flag[ i ] ) |  |
|             for( j = 0; j < 2; j++ ) { |  |
|                 delta_chroma_weight_l0[ i ][ j ] | se(v) |
|                 delta_chroma_offset_l0[ i ][ j ] | se(v) |
|             } |  |
|     } |  |
|     if( slice_type = = B ) { |  |
|         for( i = 0; i <= num_ref_idx_l1_active_minus1; i++ ) |  |
|             if( pps_curr_pic_ref_enabled_flag && |  |
|                 PicOrderCnt( RefPicList1[ i ] ) != |  |
|                 PicOrderCnt( CurrPic ) ) |  |
|                 luma_weight_l1_flag[ i ] | u(1) |
|         if( ChromaArrayType != 0 ) |  |
|             for( i = 0; i <= num_ref_idx_l1_active_minus1; i++ ) |  |
|                 if( pps_curr_pic_ref_enabled_flag && |  |
|                     PicOrderCnt( RefPicList1[ i ] ) != |  |
|                     PicOrderCnt( CurrPic ) ) |  |
|                     chroma_weight_l1_flag[ i ] | u(1) |
|         for( i = 0; i <= num_ref_idx_l1_active_minus1; i++ ) |  |
|         { |  |
|             if( luma_weight_l1_flag[ i ] ) { |  |
|                 delta_luma_weight_l1[ i ] | se(v) |
|                 luma_offset_l1[ i ] | se(v) |
|             } |  |
|             if( chroma_weight_l1_flag[ i ] ) |  |
|                 for( j = 0; j < 2; j++ ) { |  |
|                     delta_chroma_weight_l1[ i ][ j ] | se(v) |
|                     delta_chroma_offset_l1[ i ][ j ] | se(v) |
|                 } |  |
|             } |  |
|         } |  |
|     } |  |
| } |  |

The invention claimed is:

1. A method for encoding an image of a video stream according to at least one coding mode selected among a plurality of coding modes used to encode images of the video stream, where blocks of the image to be encoded are predicted as a function of at least one reference image from a set of a plurality of reference images, the at least one reference image comprising:

at least a reconstructed spatial portion of the image to be encoded and at least a low resolution portion of the image to be encoded, the choice between a reconstructed spatial sub-portion or a low resolution sub-portion to be used for encoding a block of the image to be encoded being determined as a function of a control parameter, wherein the at least one reference image comprising at least a reconstructed spatial portion of the image to be encoded and at least a low resolution portion of the image to be encoded consists in a single reference image comprising at least a reconstructed spatial portion of the image to be encoded and at least a low resolution portion of the image to be encoded, the single reference image resulting from a low resolution version of the image to be encoded, partially overwritten with at least a reconstructed spatial portion of the image to be encoded, determining whether or not a first portion of the image to be encoded, that belongs to the set of a plurality of reference images, is to be used for encoding at least a second portion of the image to be encoded, the determination being based on a parameter whose value depends on the coding mode to be used for encoding the at least second portion of the image to be encoded; and if the first portion of the image to be encoded, that belongs to the set of a plurality of reference images, is not to be used for encoding the image to be encoded, signaling weighted prediction information, wherein the parameter comprises a table of flags which is representative of the presence of the first portion of the image to be encoded in the set of a plurality of reference images, a flag of the table corresponding to each image of the set of a plurality of reference images.

2. The method of claim 1, wherein a reconstructed spatial sub-portion of the image to be encoded replaces a low resolution sub-portion in the single reference image after the low resolution sub-portion has been used for encoding at least one block of the image to be encoded and wherein the control parameter controls the replacement of low resolution sub-portions of the single reference image by reconstructed spatial sub-portions of the image to be encoded.

3. The method of claim 2, wherein the control parameter is based on motion information associated with a coding unit of the single reference image that is collocated with a coding unit being processed of the image to be encoded.

4. The method of claim 1, wherein the use of a single reference image for storing at least a reconstructed spatial portion of the image to be encoded and at least a low resolution portion of the image to be encoded is indicated by at least a flag in the declaration of the use of a low resolution portion of the image to be encoded for encoding the latter.

5. The method of claim 1, wherein the parameter comprises a flag which is representative of the presence of the first portion of the image to be encoded in the set of a plurality of reference images.

6. The method of claim 5, wherein the flag is set as a function of flags set before encoding the image to be encoded or wherein the flag is a result of a function for comparing at least a portion of the image to be encoded with at least a portion of each images of the set of a plurality of reference images.

7. The method of claim 1, wherein the flags are determined as a function of a profile associated with the coding mode.

8. The method of claim 1, wherein the plurality of coding modes used to encode images of the video stream comprises the screen content coding mode.

9. The method of claim 1, wherein the coding modes of the plurality of coding modes comply with the HEVC standard.

10. A method for decoding an image of a video stream as a function of at least one decoding mode selected among a plurality of decoding modes used to decode images of the video stream, where blocks of the image to be decoded are predicted as a function of at least one reference image from a set of a plurality of reference images, the at least one reference image comprising:
   at least a reconstructed spatial portion of the image to be decoded and at least a low resolution portion of the image to be decoded, the choice between a reconstructed spatial sub-portion or a low resolution sub-portion to be used for decoding a block of the image to be decoded being determined as a function of a control parameter,
   wherein the at least one reference image comprising at least a reconstructed spatial portion of the image to be decoded and at least a low resolution portion of the image to be decoded consists in a single reference image comprising at least a reconstructed spatial portion of the image to be decoded and at least a low resolution portion of the image to be decoded, the single reference image resulting from a low resolution version of the image to be decoded, partially overwritten with at least a reconstructed spatial portion of the image to be encoded,
   determining whether or not a first portion of the image to be decoded, that belongs to the set of a plurality of reference images, is to be used for decoding at least a second portion of the image to be decoded, the determination being based on a parameter whose value depends on the coding mode to be used for decoding the at least second portion of the image to be decoded; and
   if the first portion of the image to be decoded, that belongs to the set of a plurality of reference images, is not to be used for decoding the image to be decoded, signaling weighted prediction information,
   wherein the parameter comprises a table of flags which is representative of the presence of the first portion of the image to be decoded in the set of a plurality of reference images, a flag of the table corresponding to each image of the set of a plurality of reference images.

11. The method of claim 10 wherein a reconstructed spatial sub-portion of the image to be decoded replaces a low resolution sub-portion in the single reference image after the low resolution sub-portion has been used for decoding at least one block of the image to be decoded.

12. A device comprising a processor configured for encoding an image of a video stream according to at least one coding mode selected among a plurality of coding modes used to encode images of the video stream, where blocks of the image to be encoded are predicted as a function of at least one reference image from a set of a plurality of reference images, the at least one reference image comprising:
   at least a reconstructed spatial portion of the image to be encoded and at least a low resolution portion of the image to be encoded, the choice between a reconstructed spatial sub-portion or a low resolution sub-portion to be used for encoding a block of the image to be encoded being determined as a function of a control parameter,
   wherein the at least one reference image comprising at least a reconstructed spatial portion of the image to be encoded and at least a low resolution portion of the image to be encoded consists in a single reference image comprising at least a reconstructed spatial portion of the image to be encoded and at least a low resolution portion of the image to be encoded, the single reference image resulting from a low resolution version of the image to be encoded, partially overwritten with at least a reconstructed spatial portion of the image to be encoded,
   determining whether or not a first portion of the image to be encoded, that belongs to the set of a plurality of reference images, is to be used for encoding at least a second portion of the image to be encoded, the determination being based on a parameter whose value depends on the coding mode to be used for encoding the at least second portion of the image to be encoded; and
   if the first portion of the image to be encoded, that belongs to the set of a plurality of reference images, is not to be used for encoding the image to be encoded, signaling weighted prediction information,
   wherein the parameter comprises a table of flags which is representative of the presence of the first portion of the image to be encoded in the set of a plurality of reference images, a flag of the table corresponding to each image of the set of a plurality of reference images.

13. A method for encoding an image of a video stream according to at least one coding mode selected among a plurality of coding modes used to encode images of the video stream, where blocks of the image to be encoded are predicted as a function of at least one reference image from a set of a plurality of reference images, the at least one reference image comprising:
   at least a reconstructed spatial portion of the image to be encoded and at least a low resolution portion of the image to be encoded, the choice between a reconstructed spatial sub-portion or a low resolution sub-portion to be used for encoding a block of the image to be encoded being determined as a function of a control parameter,
   wherein the at least one reference image comprising at least a reconstructed spatial portion of the image to be encoded and at least a low resolution portion of the image to be encoded includes a first and a second reference image, the first reference image comprising at least a reconstructed spatial portion of the image to be encoded and the second reference image comprising at least a low resolution portion of the image to be encoded, the single reference image resulting from a low resolution version of the image to be encoded, partially overwritten with at least a reconstructed spatial portion of the image to be encoded,
   determining whether or not a first portion of the image to be encoded, that belongs to the set of a plurality of reference images, is to be used for encoding at least a second portion of the image to be encoded, the determination being based on a parameter whose value depends on the coding mode to be used for encoding the at least second portion of the image to be encoded; and if the first portion of the image to be encoded, that belongs to the set of a plurality of reference images, is not to be used for encoding the image to be encoded, signaling weighted prediction information, wherein the parameter comprises a table of flags which is representative of the presence of the first portion of the image to be encoded in the set of a plurality of reference images, a flag of the table corresponding to each image of the set of a plurality of reference images.

* * * * *